(12) United States Patent　　　　　　　　　(10) Patent No.: US 7,946,315 B2
Schroeder et al.　　　　　　　　　　　　　　　(45) Date of Patent: May 24, 2011

(54) SYSTEM FOR LOADING PARTICULATE MATTER INTO A TRANSPORT CONTAINER

(75) Inventors: Ryan Schroeder, Leipsic, OH (US);
Joel Bordewyk, Dell Rapids, SD (US);
Donald Krueger, Luverne, MN (US);
Michael Masgai, Crooks, SD (US);
Steven Redford, Brandon, SD (US)

(73) Assignee: POET Research, Inc., Sioux Falls, SD (US)

( * ) Notice: Subject to any disclaimer, the term of this patent is extended or adjusted under 35 U.S.C. 154(b) by 0 days.

(21) Appl. No.: 12/819,905

(22) Filed: Jun. 21, 2010

(65) Prior Publication Data

US 2010/0252140 A1　　Oct. 7, 2010

Related U.S. Application Data

(62) Division of application No. 12/573,879, filed on Oct. 5, 2009, now Pat. No. 7,762,290.

(60) Provisional application No. 61/207,885, filed on Nov. 6, 2008, provisional application No. 61/183,475, filed on Jun. 2, 2009, provisional application No. 61/247,425, filed on Sep. 30, 2009.

(51) Int. Cl.
*B65B 1/20* (2006.01)
*B65G 1/00* (2006.01)
*A01C 17/00* (2006.01)

(52) U.S. Cl. ............ 141/12; 141/73; 141/198; 141/280; 414/301; 239/687

(58) Field of Classification Search ................ 141/2, 18, 141/69, 71–73, 79, 80, 192, 198, 258, 259, 141/280; 414/297–303; 239/682, 687
See application file for complete search history.

(56) References Cited

U.S. PATENT DOCUMENTS 2,187,330 A　　1/1940　Rudd
(Continued)

FOREIGN PATENT DOCUMENTS

EP　　0482991 B1　　6/1995
(Continued)

OTHER PUBLICATIONS

DMC: David Manufacturing Co. "Grain Spreaders: Bin Level, Scattergrain and Gravity Flow", Published online at [http://www.dmc-davidmanufacturing.com./english/spreader.html#gravity], retrieved Sep. 29, 2009, 2 pages.

(Continued)

*Primary Examiner* — Timothy L Maust
(74) *Attorney, Agent, or Firm* — Turocy & Watson, LLP

(57) ABSTRACT

A method of loading particulate matter into a transport container having at least one chamber with a peripheral region using an apparatus comprising a rotatable member configured to be positioned at least partially into an opening for the chamber. The method can include the acts of locating the apparatus adjacent the opening for the chamber by movement relative to the transport container, initiating a flow of particulate matter from the apparatus into the opening, rotating the rotatable member to facilitate the dispensing of particulate matter within the chamber, and engaging the rotatable member with particulate matter so that at least a portion of particulate matter that has been dispensed into the chamber is pushed into the peripheral region within the chamber.

19 Claims, 31 Drawing Sheets

U.S. PATENT DOCUMENTS

| | | | |
|---|---|---|---|
| 2,589,583 A * | 3/1952 | Thompson | 53/239 |
| 2,596,018 A * | 5/1952 | Fishburne et al. | 141/12 |
| 2,712,407 A | 7/1955 | Guthrie et al. | |
| 2,747,500 A | 5/1956 | Weatherly | |
| 2,766,782 A | 10/1956 | Guthrie et al. | |
| 2,772,124 A | 11/1956 | Smith | |
| 3,048,282 A | 8/1962 | Wilhelm et al. | |
| 3,200,859 A | 8/1965 | Parker, Jr. | |
| 3,315,823 A | 4/1967 | Rikoff | |
| 3,357,576 A | 12/1967 | Strombeck et al. | |
| 3,490,619 A | 1/1970 | De Wittie | |
| 3,572,523 A | 3/1971 | Cymara | |
| 3,576,262 A | 4/1971 | Konchesky et al. | |
| 3,796,325 A | 3/1974 | Ide | |
| 3,880,300 A | 4/1975 | Uhl | |
| 3,881,409 A | 5/1975 | Frigieri | |
| 3,902,610 A | 9/1975 | Sukup | |
| 3,911,975 A * | 10/1975 | van Soestbergen et al. | 141/95 |
| 3,924,761 A | 12/1975 | Lambert, Jr. | |
| 3,972,686 A | 8/1976 | Johnson et al. | |
| 4,031,929 A | 6/1977 | Cobb et al. | |
| 4,065,005 A | 12/1977 | Mahle et al. | |
| 4,185,669 A * | 1/1980 | Jevakohoff | 141/59 |
| 4,272,028 A | 6/1981 | Cobb | |
| 4,318,511 A | 3/1982 | Clark | |
| 4,342,345 A | 8/1982 | Nadin et al. | |
| 4,397,423 A | 8/1983 | Beaver et al. | |
| 4,424,837 A | 1/1984 | Farrell | |
| 4,433,707 A | 2/1984 | Farnham | |
| 4,472,102 A | 9/1984 | Behringer | |
| 4,529,337 A | 7/1985 | Hilgraf et al. | |
| 4,564,328 A | 1/1986 | Loutaty et al. | |
| 4,572,782 A | 2/1986 | Smith et al. | |
| 4,691,843 A | 9/1987 | Dunan | |
| 4,738,774 A * | 4/1988 | Patrick | 209/236 |
| 4,776,519 A | 10/1988 | Zweegers | |
| 4,820,108 A | 4/1989 | Kneer | |
| 4,902,185 A | 2/1990 | Dixon et al. | |
| 4,972,884 A | 11/1990 | Souers et al. | |
| 5,100,602 A | 3/1992 | Day et al. | |
| 5,105,861 A | 4/1992 | Berger et al. | |
| 5,280,813 A | 1/1994 | Jackson | |
| 5,324,159 A | 6/1994 | Nowobilski et al. | |
| 5,348,434 A | 9/1994 | Peeples et al. | |
| 5,393,189 A | 2/1995 | Berquist | |
| 5,415,512 A | 5/1995 | Buchfink | |
| 5,575,316 A | 11/1996 | Pollklas | |
| 5,687,780 A | 11/1997 | Minami | |
| 5,735,319 A | 4/1998 | McNamara et al. | |
| 5,881,780 A | 3/1999 | Matye et al. | |
| 5,895,194 A | 4/1999 | Galas et al. | |
| 5,906,229 A | 5/1999 | Haquet et al. | |
| 5,906,293 A | 5/1999 | Geiser et al. | |
| 5,950,694 A | 9/1999 | Jama et al. | |
| 6,443,193 B1 | 9/2002 | Blasco | |
| 6,708,851 B2 | 3/2004 | DaSilva | |
| 6,729,365 B1 * | 5/2004 | Cote et al. | 141/69 |
| 7,252,473 B2 | 8/2007 | Bailey | |
| 7,762,290 B2 | 7/2010 | Schroeder et al. | |
| 2003/0121760 A1 | 7/2003 | Forrest | |
| 2003/0178347 A1 | 9/2003 | Poussin | |
| 2004/0025966 A1 | 2/2004 | Whitley et al. | |
| 2007/0297880 A1 | 12/2007 | Pinon et al. | |
| 2008/0216918 A1 | 9/2008 | Comardo et al. | |

FOREIGN PATENT DOCUMENTS

EP          1407993 B          10/2002

OTHER PUBLICATIONS

FLSMIDTH. "Filling railcars to the brim", Powder and Bulk Engineering, Feb. 1999, 4 pages.

Key, Steve. "Proposal No. 37562-DCL-SK-0—Rotary Trimming Spoon (RTS800)", Letter from PESCO, Inc. Representing DCL, Inc. to Ms. Steph Hummel of Broin & Associates. Feb. 6, 2006. Charlevoix, Michigan. 5 pages.

OA dated Apr. 5, 2010 for U.S. Appl. No. 12/573,879, 28 pages.

FLSmidth Co. "Pneumatic Transport Components Catalog: FULLOAD(TM) Automatic Operation Model A," Published online at http:catalog.conveyorspneumatic.com/Asset/131-132.pdf, retrieved Oct. 5, 2009, 2 pages.

International Search Report and Written Opinion mailed Aug. 30, 2010 for International Application No. PCT/US2010/039362, 12 pages.

* cited by examiner

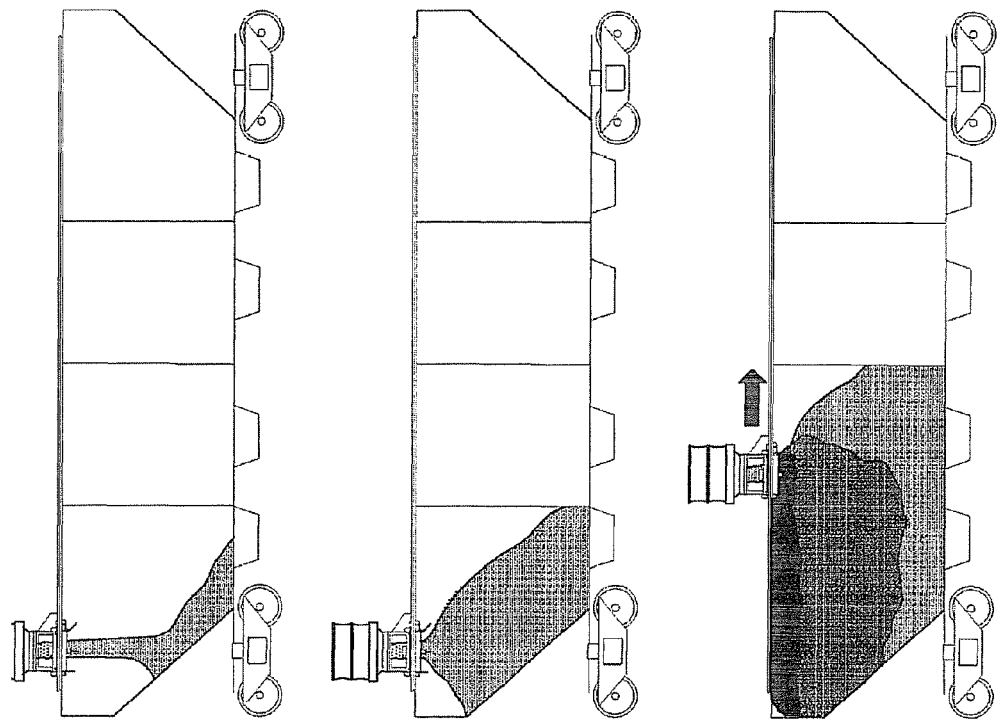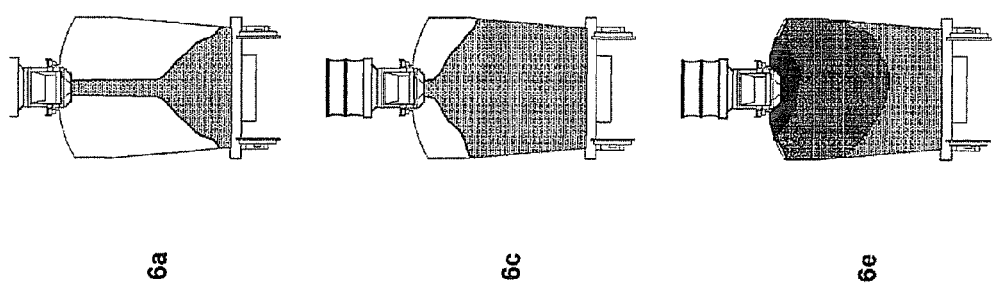
FIGURES 6a - 6f

7b

7a

CONVENTIONAL LOADING

7d

7c

LOADED ACCORDING TO AN EMBODIMENT

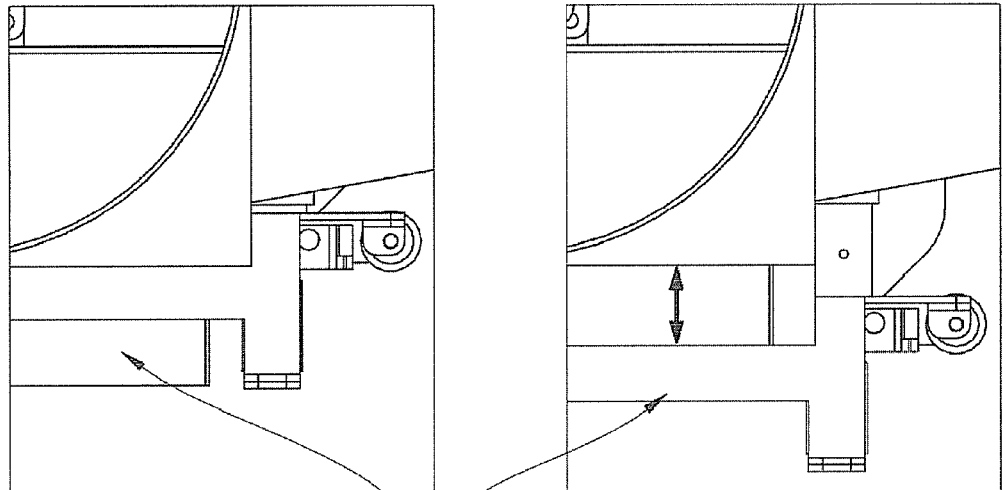
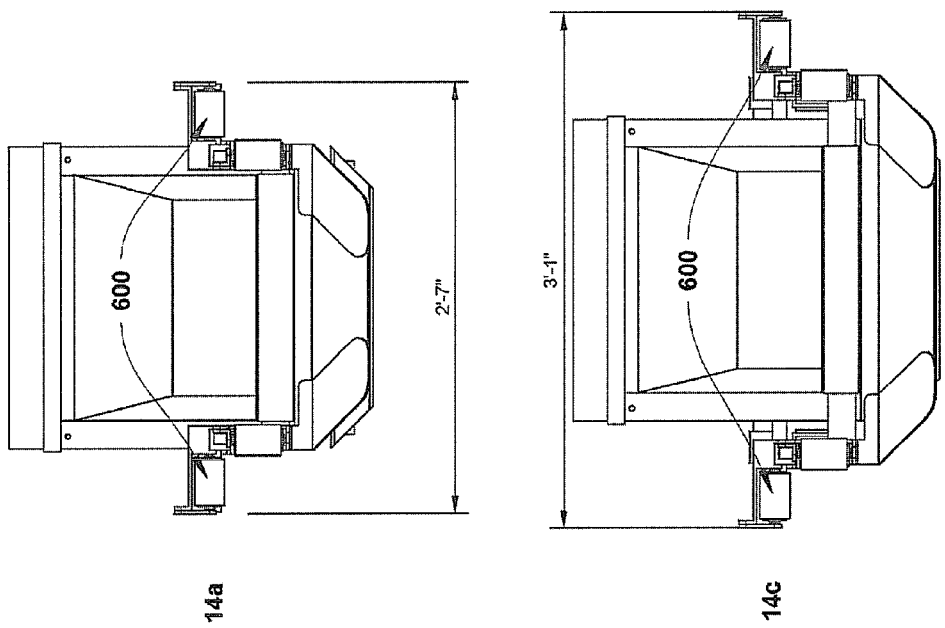
FIGURES 14a - 14d

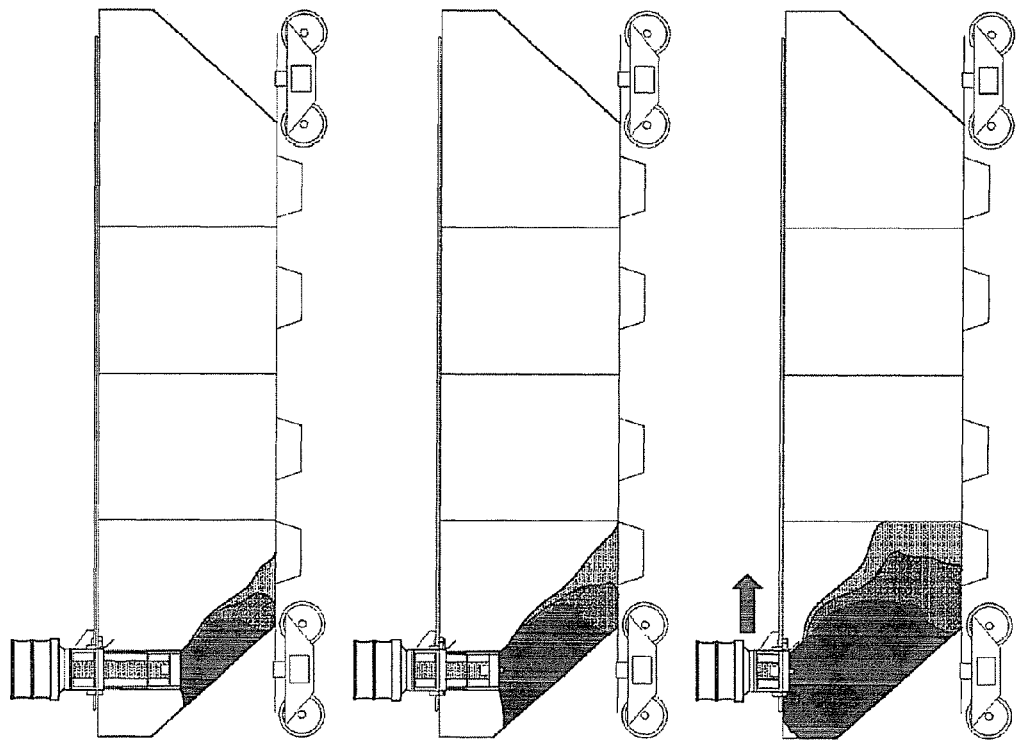
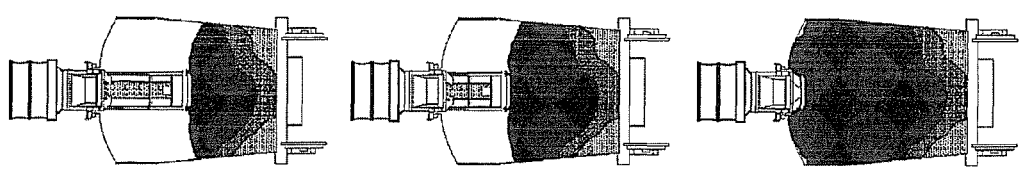
FIGURES 27a - 27f

SYSTEM FOR LOADING PARTICULATE MATTER INTO A TRANSPORT CONTAINER

CROSS-REFERENCE TO RELATED APPLICATIONS

The present application is a divisional of U.S. application Ser. No. 12/573,879 entitled "SYSTEM FOR LOADING PARTICULATE MATTER INTO A TRANSPORT CONTAINER" which was filed Oct. 5, 2009, and is incorporated by reference and which claims the priority of: (a) U.S. Provisional Patent Application Ser. No. 61/207,885 entitled "SYSTEMS AND METHODS FOR LOADING PARTICULATE MATERIAL INTO A TRANSPORT CONTAINER" which was filed Nov. 6, 2008, and is incorporated by reference; (b) U.S. Provisional Patent Application Ser. No. 61/183,475 entitled "METHOD AND APPARATUS FOR LOADING PARTICULATE MATERIAL INTO A TRANSPORT CONTAINER" which was filed Jun. 2, 2009, and is incorporated by reference; and (c) U.S. Provisional Patent Application Ser. No. 61/247,425 entitled "SYSTEM FOR LOADING PARTICULATE MATTER INTO A TRANSPORT CONTAINER" which was filed Sep. 30, 2009, and is incorporated by reference.

TECHNICAL FIELD

The present application relates to material handling, and more particularly to loading of particulate matter into a transport container.

BACKGROUND

According to one known method of producing corn-based ethanol, in addition to ethanol, dried solids referred to as dried distillers' grains (DDG) or dried distillers' grains with solubles (DDDS), both particulate matter, are produced. DDG are conventionally shipped in transport containers, such as railcars, truck containers, or containers that may be hauled on a barge or a ship.

It is known to load particulate matter into transport containers. According to one known loading arrangement, facilitated by gravity, particulate matter is released from a storage container, through a spout, and into a transport container. Such known methods may not fully load the containers, as particulate matter loaded in this manner may not be densified (i.e., packed as fully as possible), and may form voids or empty spaces within the transport containers.

It would be advantageous to have a method and an apparatus or a system for loading particulate matter into a transport container that loads transport containers and that is capable of densifying the particulate matter (e.g., by minimizing the formation of voids or empty spaces during loading of the container).

SUMMARY

The subject disclosure relates to a method of loading particulate matter (e.g., dried distiller's grains (DDG)) into a movable transport container with a peripheral region using an apparatus comprising a rotatable member configured to be positioned at least partially into an opening for the chamber. The method can employ the act of locating the apparatus adjacent to the opening for the chamber. The method can then employ the act of initiating a flow of particulate matter from the apparatus into the opening. The method can then employ the act of rotating the rotatable member to facilitate the dispensing of particulate matter within the chamber. The method can then employ the act of engaging the rotational member with particulate matter so that at least a portion of particulate matter that has been dispensed into the chamber is pushed into the peripheral region within in the chamber.

Another embodiment relates to an apparatus for loading particulate matter (e.g., dried distiller's grains (DDG)) into a movable transport container. The apparatus can employ a housing having an inlet configured to receive particulate matter and an outlet configured to dispense particulate matter. The apparatus can also employ a motor and a rotational member driven by the motor and at least partially disposed beneath the housing so that the particulate matter dispensed from the outlet is pushed within the container.

Another embodiment relates to a method of loading particulate matter into a movable transport container having at least one opening using an apparatus having a housing and a rotatable member extending at least partially below the housing. The method employs the act of placing the apparatus at least partially into the opening of the transport container. The method then employs the act of enabling the particulate matter to flow through the apparatus and into the transport container. The method then employs the act of actuating the rotatable member to radially spread the particulate matter within the transport container when a height of the particulate matter reaches a first detected level. The method then employs the act of advancing the transport container relative to the apparatus until a desired volume of the particulate matter is loaded in the transport container.

DESCRIPTION OF THE DRAWINGS

FIGS. 6a through 6f show various schematic views of a filling method for a transport container according to an embodiment. FIGS. 6a and 6b illustrate an initial particulate matter filling. FIGS. 6c and 6d illustrate the moment when rotation of the rotatable member (e.g., spreader blade) is actuated. FIGS. 6e and 6f illustrate the progression of the loading apparatus as it advances across the railcar.

FIGS. 14a through 14d are schematic views illustrating the an embodiment adjusted to fit transport container openings of varying widths: FIG. 14a is a schematic end view of an embodiment configured to a narrow opening; FIG. 14b is a schematic top view of an embodiment configured to a narrow opening; FIG. 14c is a schematic end view of an embodiment configured to a wide opening; and FIG. 14d is a schematic top view of the loading apparatus configured to a wide opening.

FIGS. 27a through 27f are various schematic views of a filling method for a railcar employing an embodiment in which the rotatable member is positioned within the transport container remain in the pile of particulate matter as the transport container is loaded.

DESCRIPTION OF THE EMBODIMENTS

Figure 1:
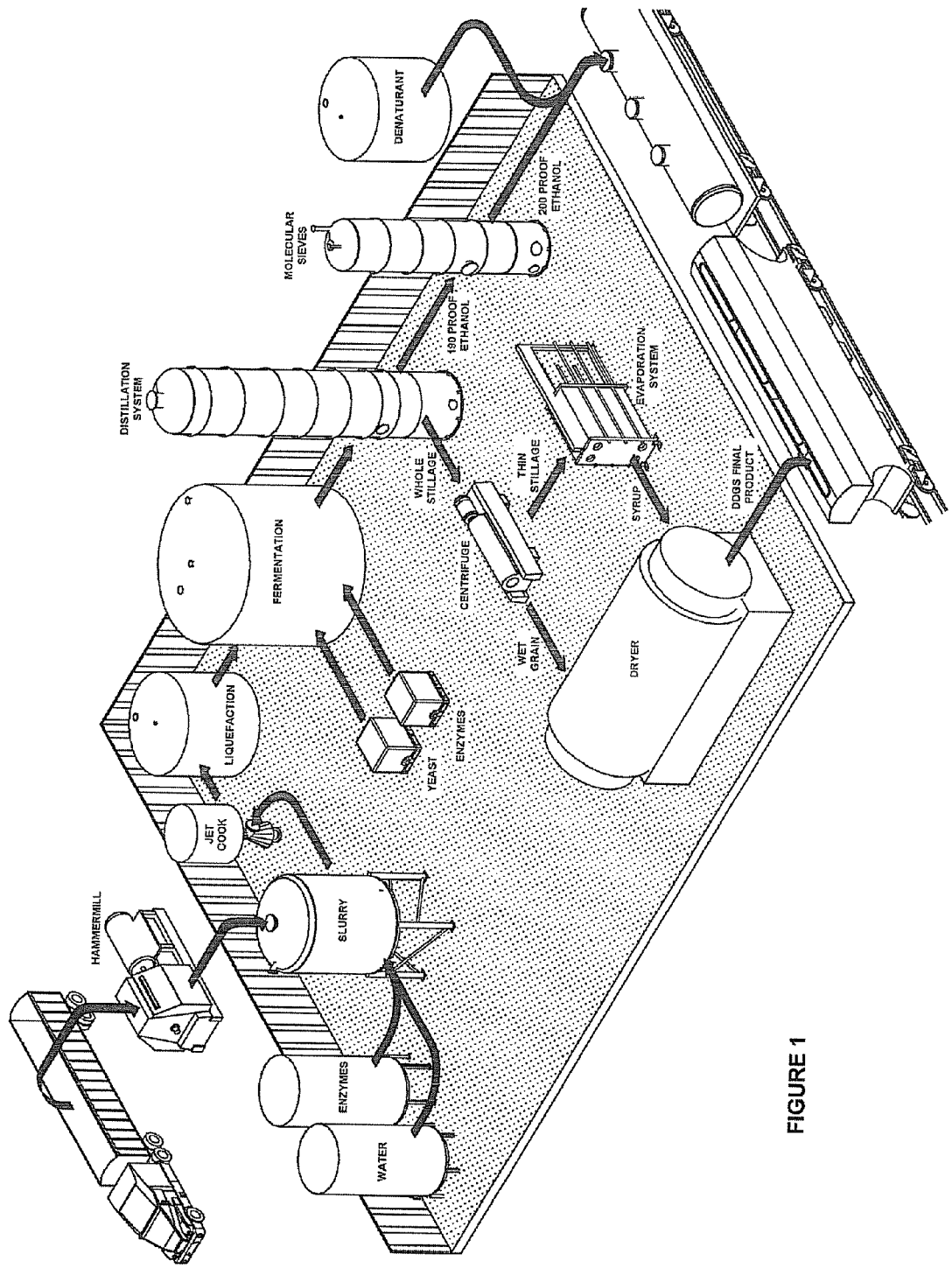
FIG. 1 is a schematic system block diagram of an ethanol plant, illustrating a facility for producing corn-based ethanol producing dried distiller's grains with solubles (DDGS) or dried distiller's grains (DDG) as a co-product.
Figure 2:
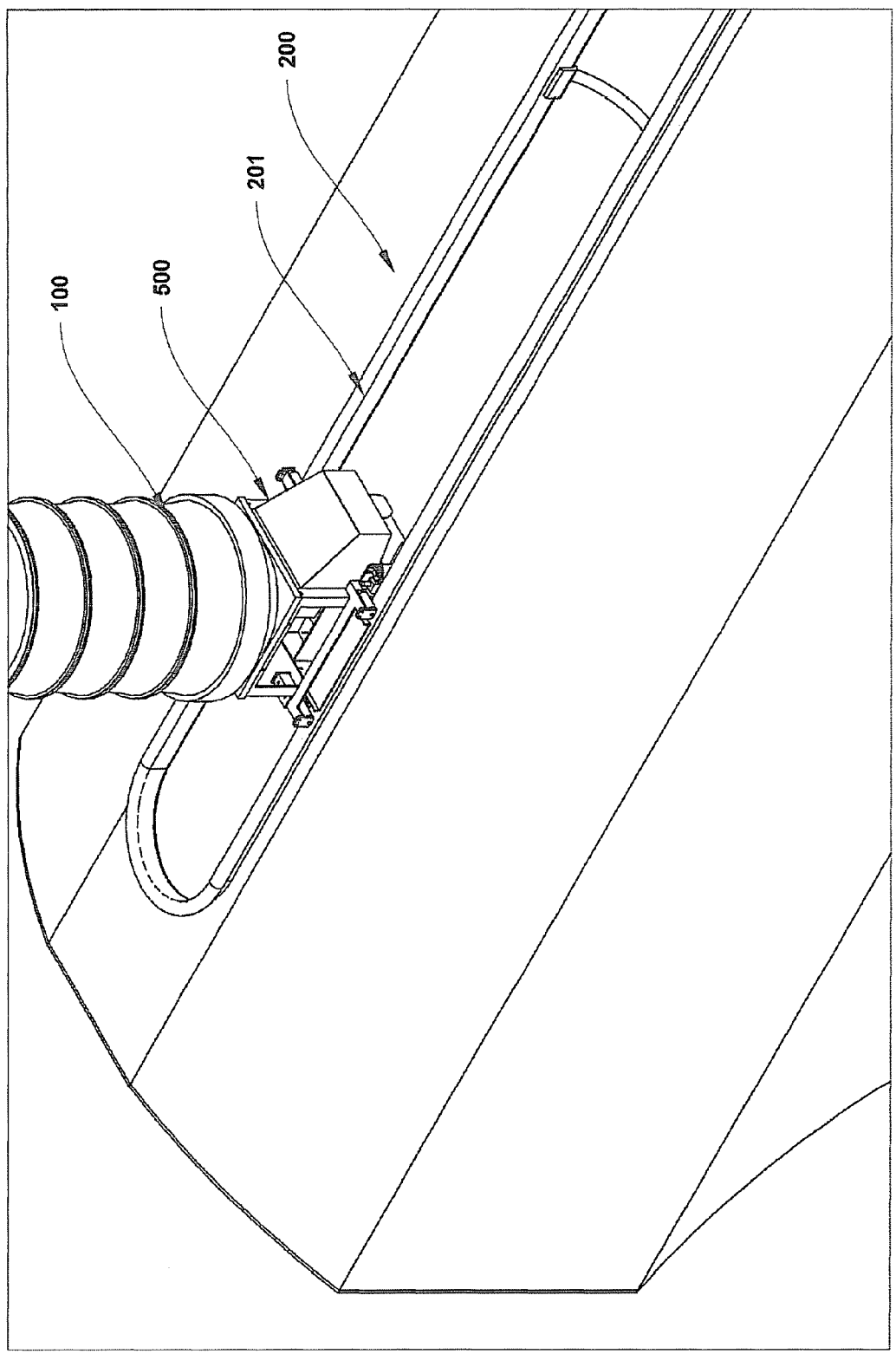
FIG. 2 is a schematic perspective front-side view of an embodiment mounted on a railcar.

FIG. 1 is a schematic system block diagram of an ethanol plant, illustrating a facility for producing corn-based ethanol. As shown in FIG. 2, an embodiment of an apparatus for loading particulate matter (e.g., DDG or DDGS) into a transport container 200 (e.g., railcar) is shown mounted on a railcar. The apparatus operates by mechanically spreading particulate matter radially within the railcar, countering the effects of the natural repose angle of the particulate matter. An embodiment can be used to load a railcar with particulate matter from a hopper (e.g. a silo, surge bin, or the like) by receiving particulate matter from a loading spout 100 in communication with the silo or surge bin. It is to be understood that an embodiment is not limited to using hoppers but that all other options where transport containers are loaded from above with particulate matter (e.g., with conveyor belts or conveyor pipes) can also be used. A transport container (e.g., railcar) can include a floor having spaced-apart end walls and side walls that extend to define a container, with a top wall to enclose the container. The top wall can have an elongated opening 201, which may be centrally located between the side walls. The opening 201 can substantially extend between the end walls of the container. Within the container, one or more internal walls may extend between the side walls to divide the container into a plurality of chambers.

Figure 3:
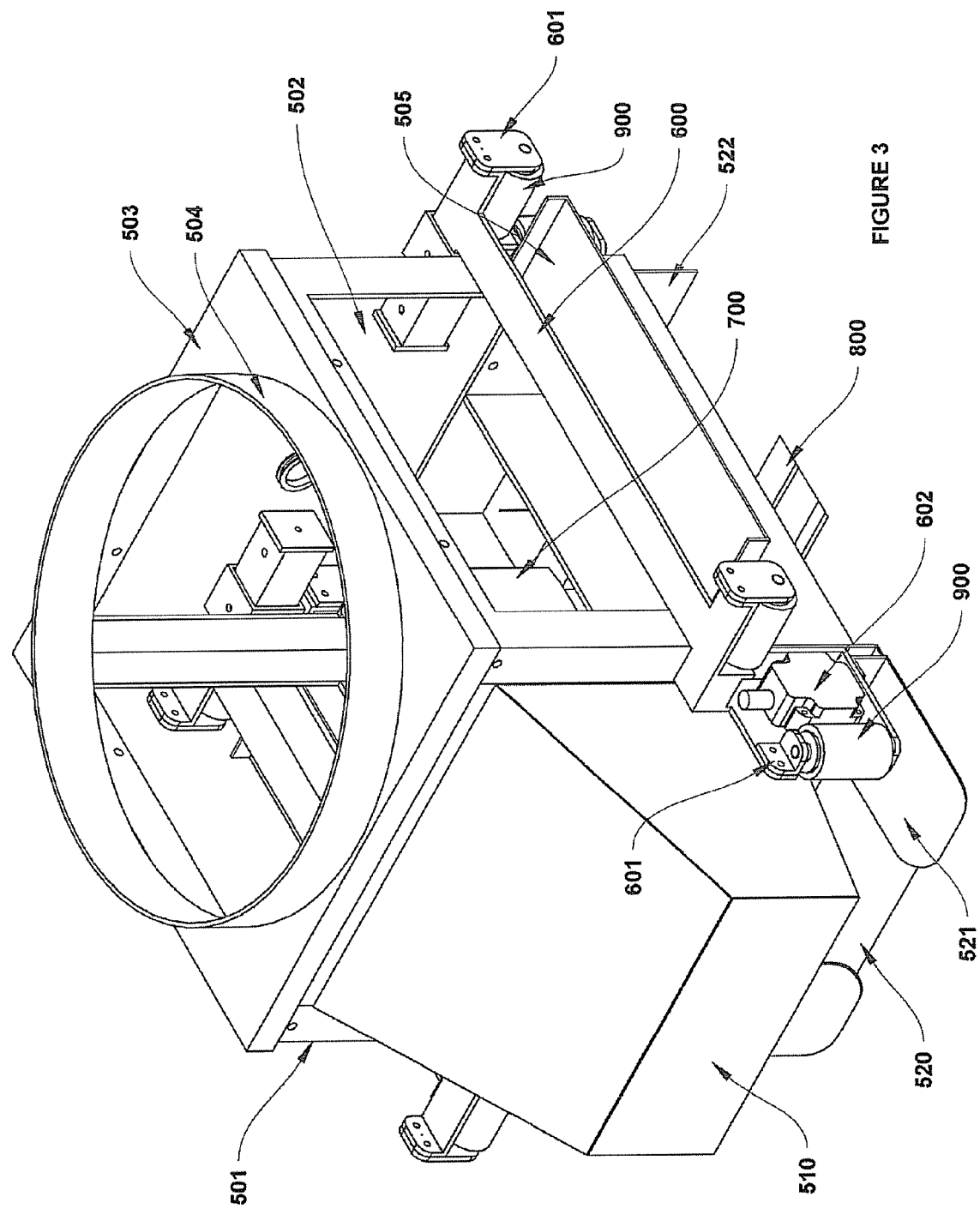
FIG. 3 is a schematic perspective front-side view of an embodiment.

As shown in FIG. 3, the apparatus comprises a housing 501 with windows 502, a detachable top side 503 having an inlet defined by a loading spout engagement ring 504, a bypass path 510, one or more deflectors 520, 521, 522, one or more splash panels 505, one or more adjustable support brackets 600, safety sensors 602, a motor 700, a rotatable member 800, and one or more wheels 900.

Figure 4:
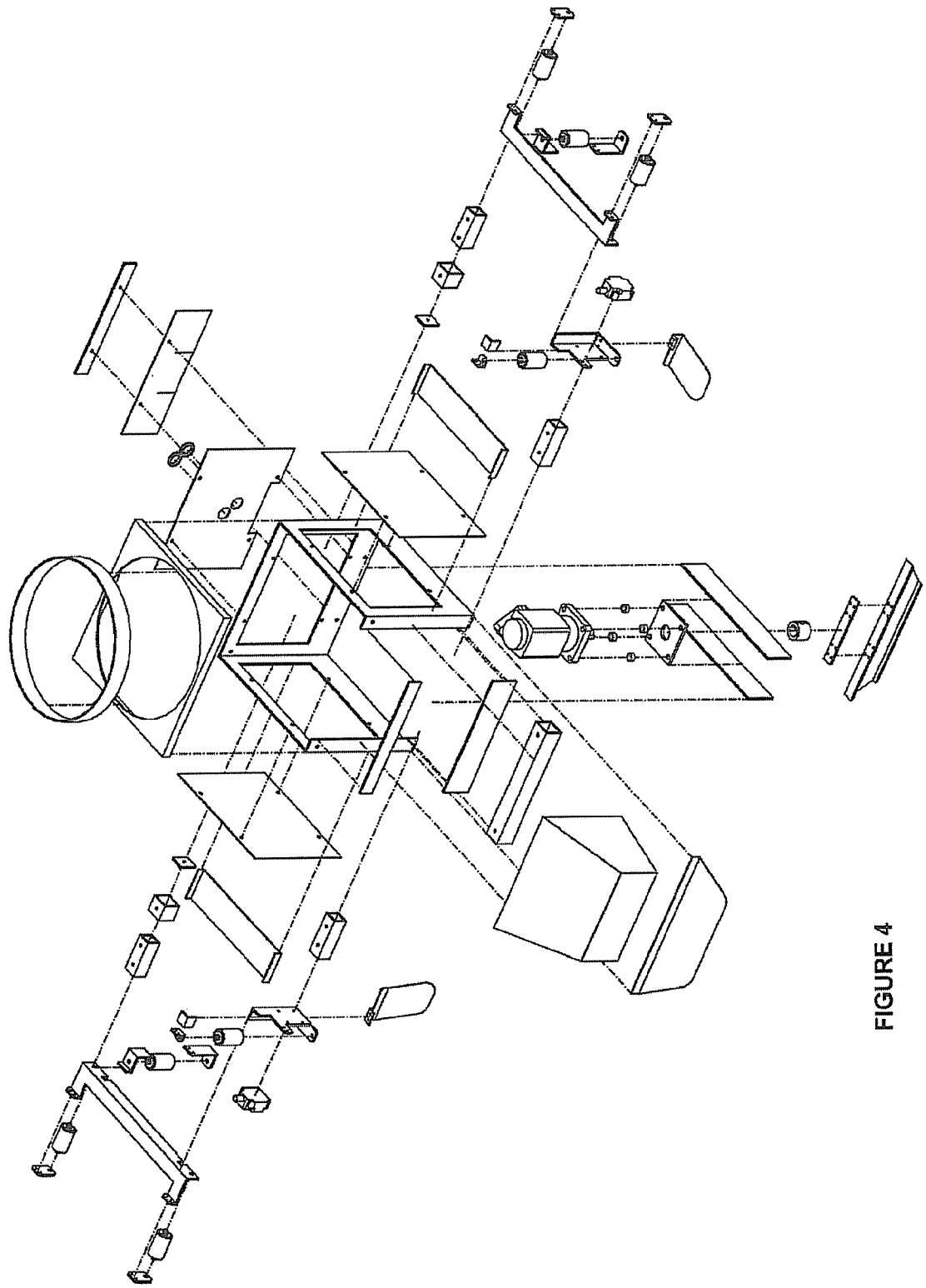
FIG. 4 is an exploded schematic perspective front-side view of an embodiment.

According to an embodiment, particulate matter is provided for loading into the transport container through the opening of the container. Using an embodiment of a loading apparatus to move particulate matter towards the walls of the container increases the amount of particulate matter that can be loaded into the transport container. The loading apparatus may be located at multiple positions along the opening of the container to evenly distribute and compact particulate matter into the container. FIG. 2 shows a loading spout 100 engaging the embodiment of the loading apparatus 500 positioned on top of the opening 201 of a container 200. FIG. 4 shows an exploded perspective front-side view of an embodiment.

Figure 5:
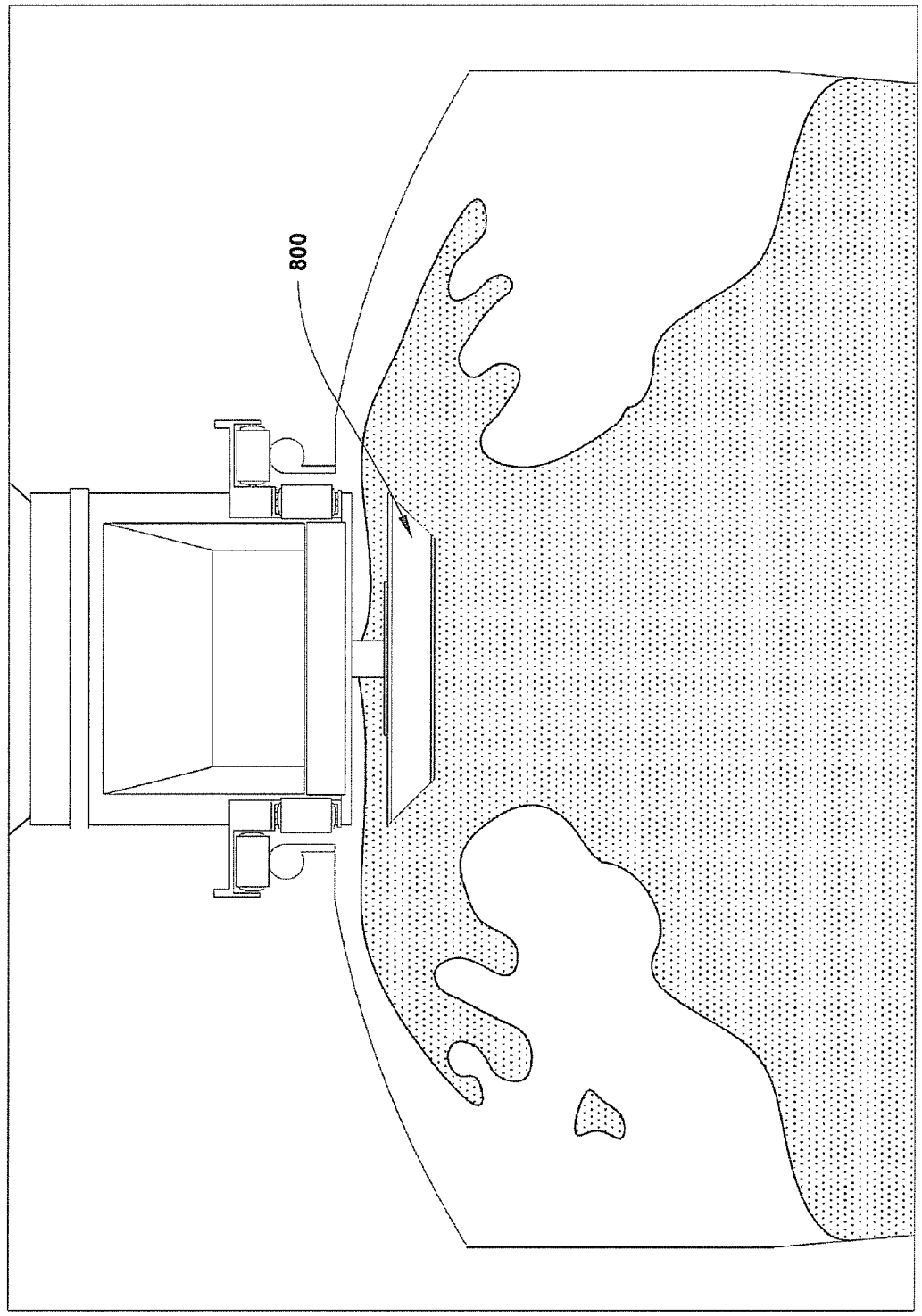
FIG. 5 is a schematic cross-sectional view illustrating an embodiment in operation, pushing particulate matter into open areas of the transport container.

According to an embodiment, the rotatable member 800 physically contacts particulate matter in order to distribute it as shown in FIG. 5. When immersed in particulate matter, the rotatable member rotates and pushes particulate matter radially away from the rotatable member, into the voids in the container. During operation (e.g., when the rotatable member is being rotated) particulate matter is fed through the loading spout and through the loading apparatus. Because particulate matter is continually pushed outwardly by the rotatable member, particulate matter is unable to form a pile having its natural repose angle. Once the transport container is substantially loaded with particulate matter, continued rotation of the rotatable member causes densification of particulate matter near the rotatable member.

FIGS. 6a through 6f show various schematic views illustrating the process of filling a transport container with particulate matter employing an embodiment. As shown in FIGS. 6a and 6b, when the container is substantially empty, particulate matter may flow through the housing and into the container with or without the motor of the loading apparatus being operated. Operating the motor when the container is substantially empty will cause particulate matter to be distributed radially within the container, but can also create dust. According to an exemplary embodiment, when the height of particulate matter has reached the rotatable member as shown in FIGS. 6c and 6d, the loading apparatus is enabled to spread particulate matter into the end corners of the container and achieve added compaction in the area surrounding the rotatable member. Use of an embodiment fills areas near the corners and side walls of the container (e.g., the peripheral region of the container) without requiring manual shoveling or re-leveling of particulate matter within the container.

According to an embodiment, particulate matter is spread by the rotatable member such that some of particulate matter particles impinge upon (e.g., are thrown out towards) the inner surfaces of the side walls, causing the particulate matter to fill the container substantially evenly. Once particulate matter has substantially filled the area near the rotatable member and particles are no longer thrown out towards the voids, the loading apparatus acts to physically push a mass of particulate matter away from the rotatable member apparatus and begin compacting (e.g., densifying) the particulate matter around the rotatable member as more particulate matter is poured into the housing. After the rotatable member has provided a desired level of compaction in one area of the container, the container can be indexed, such that the transport container is moved to a new location beneath an embodiment of the loading apparatus (e.g., a railcar can be advanced relative to an embodiment). Alternatively, the loading apparatus itself can be moved to a new location along the container, as shown in FIG. 6f. In either process, the loading apparatus move relative to the container at a rate chosen so that the rotatable member remains immersed in the pile. It is understood that a transport container loaded according to an embodiment does not have to be moving or be moving uniformly during the entire loading process. According to an embodiment, the rotating action of the rotatable member and pressure from particulate matter built up behind the deflector naturally propels the loading apparatus to in a direction at a slow pace. If an area is completely full of particulate matter, and something prevents the loading apparatus from moving forward without operator intervention, the bypass path will allow particulate matter to continue entering the housing without plugging the loading spout by providing an alternative path for the particulate matter to flow, in which the particulate matter can continue filling the container until the loading apparatus can be advanced relative to the container.

As the loading apparatus nears the end of the container or any of the chambers therein, the decrease in the open volume of the chamber being loaded will cause particulate matter to build up around the deflector. The additional particulate matter around the front of the loading apparatus creates a barrier that acts to allow the rotatable member to rotate at higher speeds without releasing additional dust. The barrier created by the pile of particulate matter at the front of the loading apparatus traps higher velocity particulate matter coming off of the face of the rotatable member. By increasing the speed of the rotatable member as the loading apparatus reaches at the end of each chamber, more particulate matter can be pushed into the voids while increasing compaction of particulate matter near the rotatable member. An embodiment can use discrete speed settings in which a control system or operator selects a desired speed and the rotatable member operates at that speed. Another embodiment can use a variable speed design which can drive the rotatable member at an infinite number of speeds within a desired range.

Figure 7A:
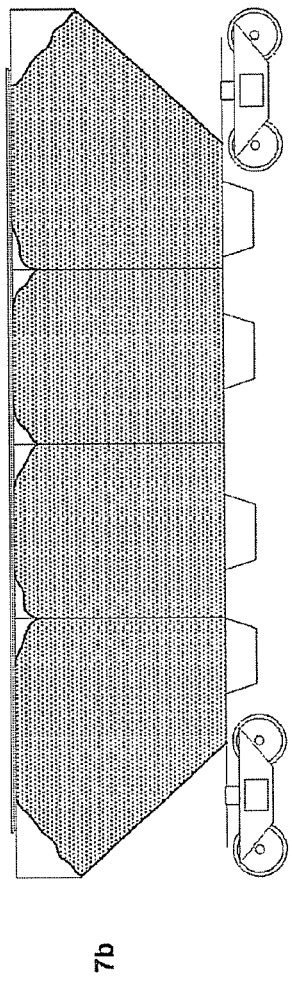
FIGS. 7a through 7d are schematic illustrations comparing a transport container filled with a loading method not employing an embodiment (FIGS. 7a and 7b) to a transport container loaded according to an embodiment (FIGS. 7c and 7d).
Figure 7B:
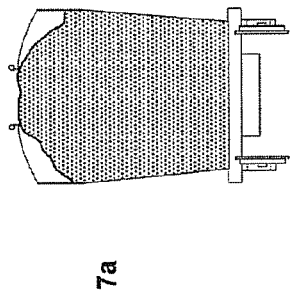
Figure 7C:
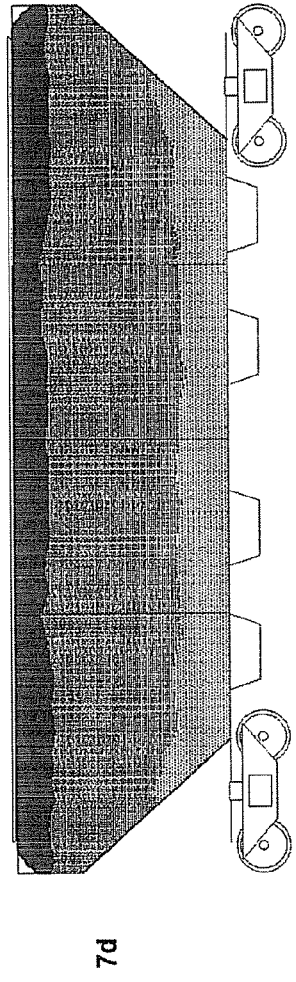
Figure 7D:
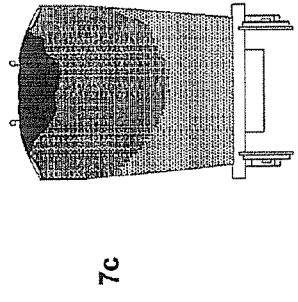

FIGS. 7a through 7d are schematic illustrations comparing a transport container containing particulate matter loaded according to a loading method not employing an embodiment to a container loaded with particulate matter according to an embodiment. FIGS. 7a and 7b are schematic illustrations of the end and side cut-away views of a container that has been filled without utilizing an embodiment. FIGS. 7c and 7d are schematic illustrations of the end and side cut-away views of a container that has been filled using an embodiment. FIGS. 7c and 7d illustrate particulate matter spread into the spaces at the front and sides of the container. Once particulate matter has been spread into these spaces, continued rotation of the rotatable member can exert an oscillating compressive force on particulate matter between the rotatable member and the walls of the container. This compressive force can increase the density (e.g., bulk density) of particulate matter surrounding the blade.

Figure 8:
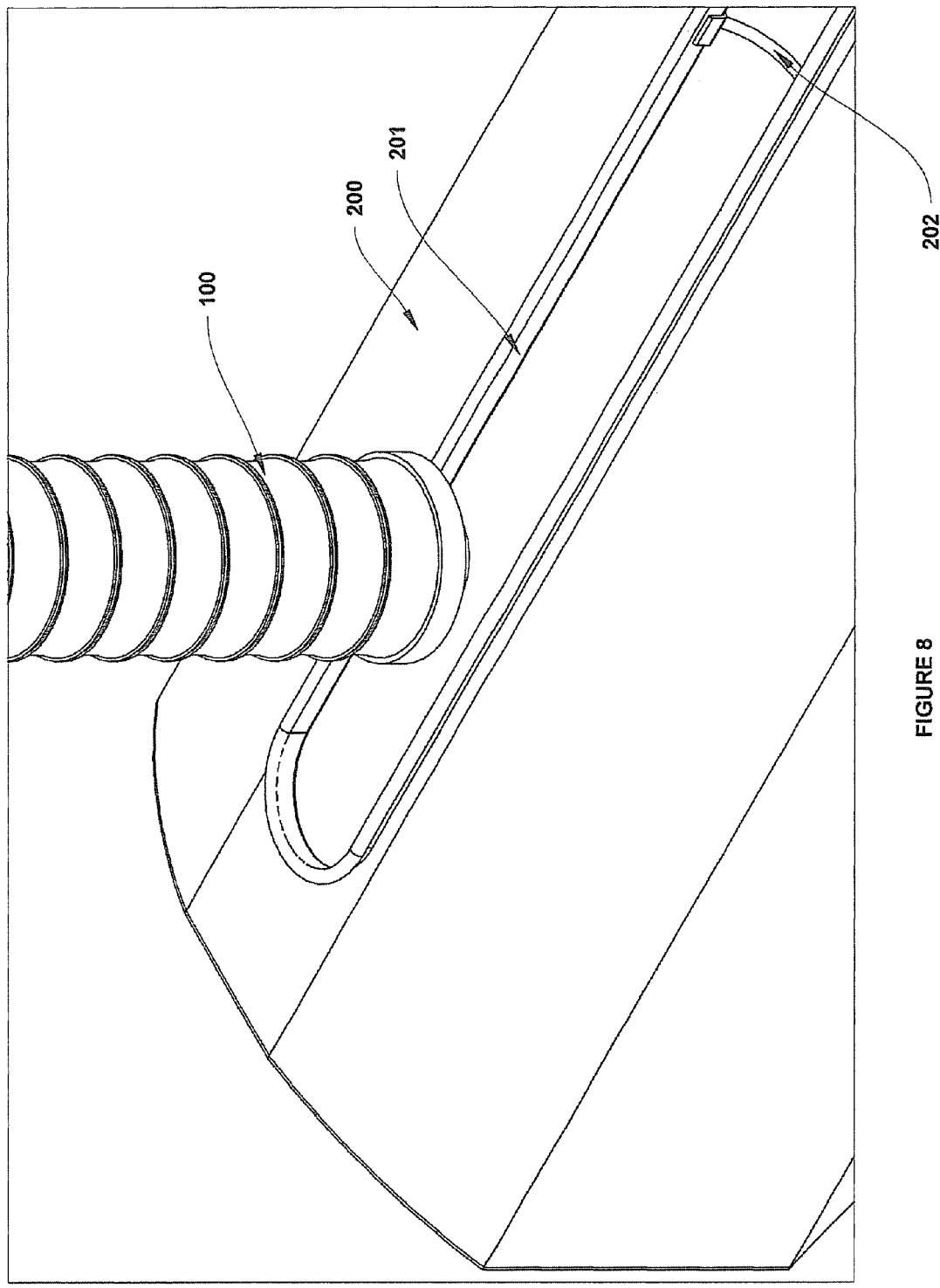
FIG. 8 is a schematic perspective view of a system for loading particulate matter into a transport container without employing an embodiment.

FIG. 8 illustrates a system for loading particulate matter into a transport container without employing an embodiment, in which the particulate matter is received through the opening of a container from a loading spout 100 in communication with a silo or surge bin. Particulate matter loaded into a container in this manner is received into the container into the opening 201. Particulate matter enters the container, displacing air within the container. As air is displaced, fine particles from the particulate matter may form dust. According to this method, particulate matter is not evenly distributed during loading because of the angle of repose of the particulate matter.

Figure 9A:
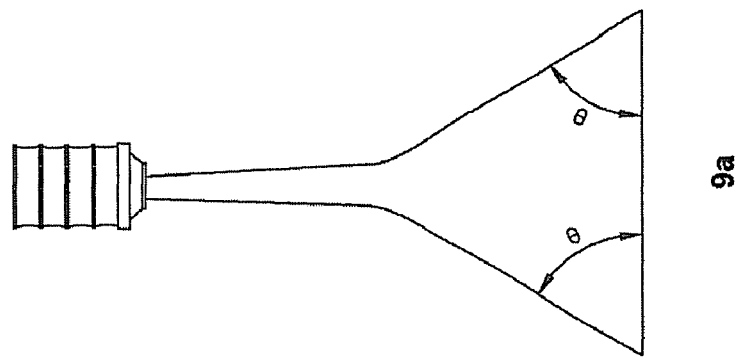
FIGS. 9a through 9c are schematic illustrations of the repose angle of a pile of particulate matter.
Figure 9B:
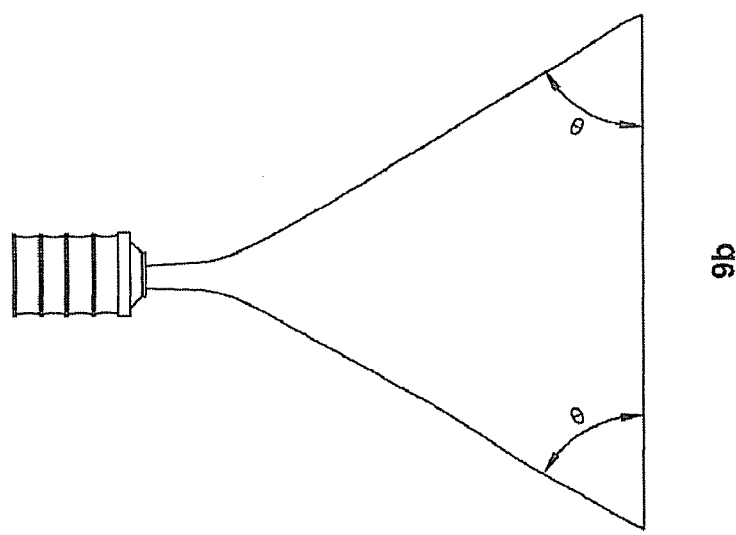
Figure 9C:
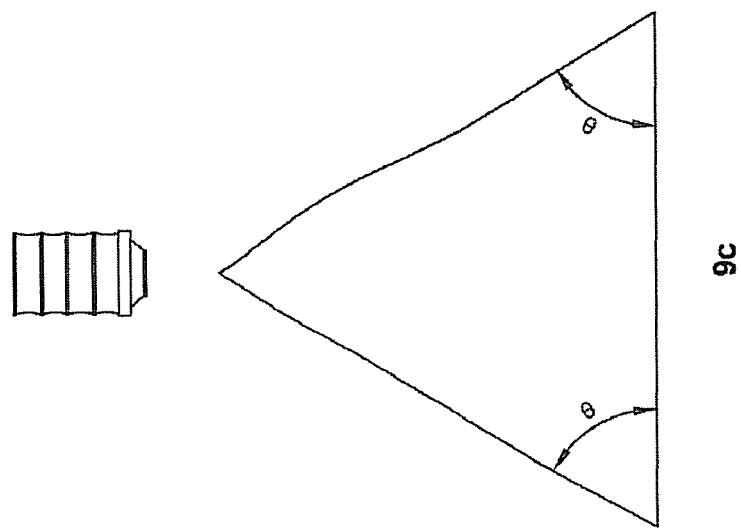
Figures 10A, 10B:
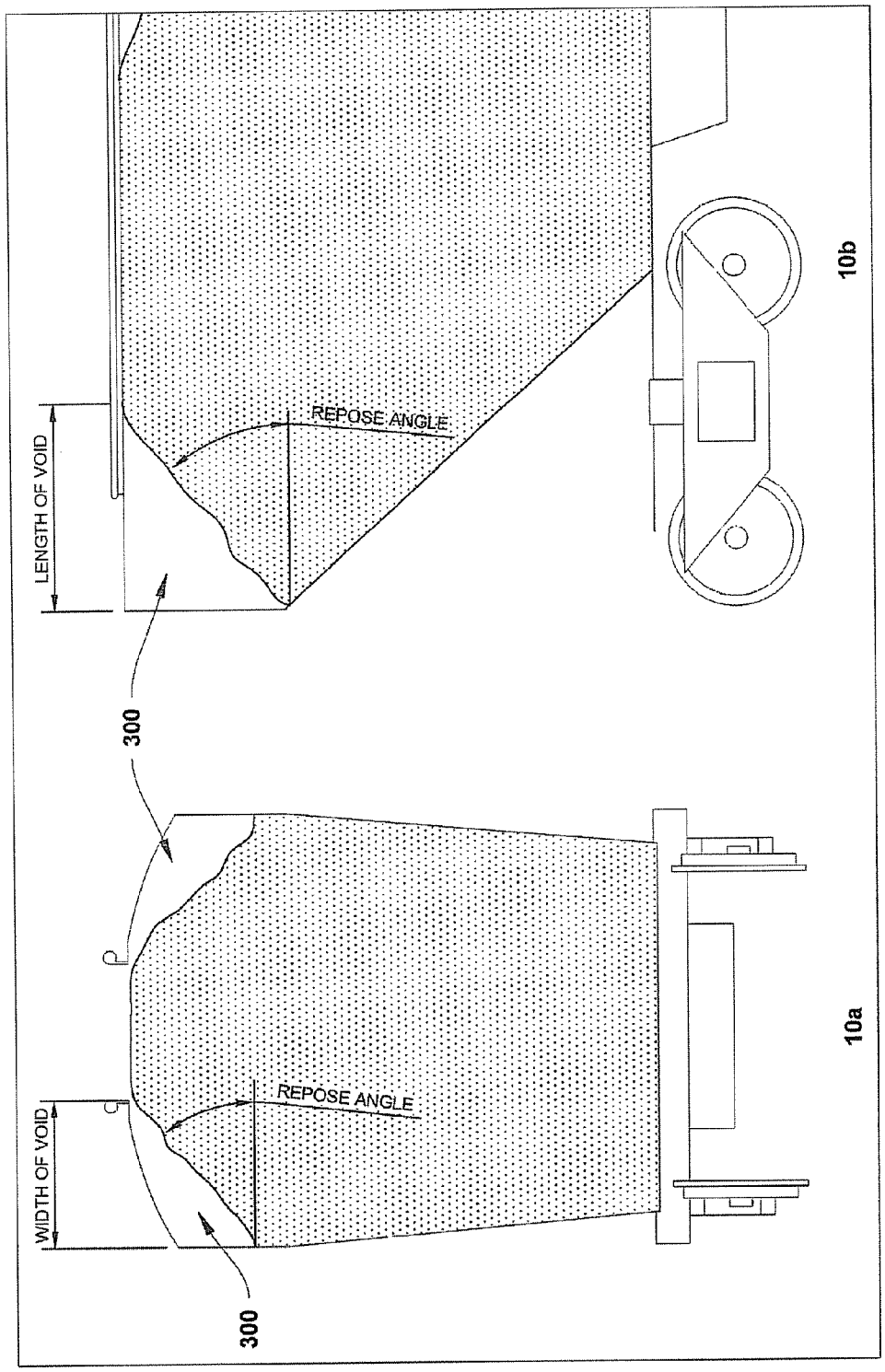
FIGS. 10a and 10b are schematic illustrations of unfilled areas (e.g., voids) of a transport container loaded without employing an embodiment, and without re-leveling.

The slope, or angle, created by the side of a pile of DDG or other particulate matter measured from a horizontal line is called the angle of repose, shown as θ in FIGS. 9a through 9c. FIGS. 9a through 9c illustrates particulate matter being loaded onto a flat surface. As particulate matter piles up, the angle of repose remains substantially constant. The angle of repose is substantially determined by particulate shape of the matter, density, and coefficient of friction. Particulate matter can be poured into the container until the apex of the pile reaches the top of the opening. Pouring additional particulate matter into the container at that point can result in the particulate matter overflowing the opening. The resultant pile of particulate matter unevenly loads the container with a larger amount of particulate matter in the container's center, below the opening. Areas about the exterior walls of the container are not filled, as particulate matter is unable to flow at less than its angle of repose, as schematically illustrated in FIGS. 10a through 10b. An estimate of the volume of the voids along the exterior walls of the container as shown in FIG. 10a can be made using Formula 1. An estimate of the volume at both ends of the container as shown in FIG. 10b can be made using Formula 2.

$$\text{Void Volume 1} \approx (\text{width of void})^2 [\tan(\text{repose angle})] (\text{length of container}) \quad \text{Formula 1}$$

$$\text{Void Volume 2} \approx (\text{length of void})^2 [\tan(\text{repose angle})] (\text{width of container}) \quad \text{Formula 2}$$

Figures 11A, 11B, 11C, 11D, 11E, 11F:
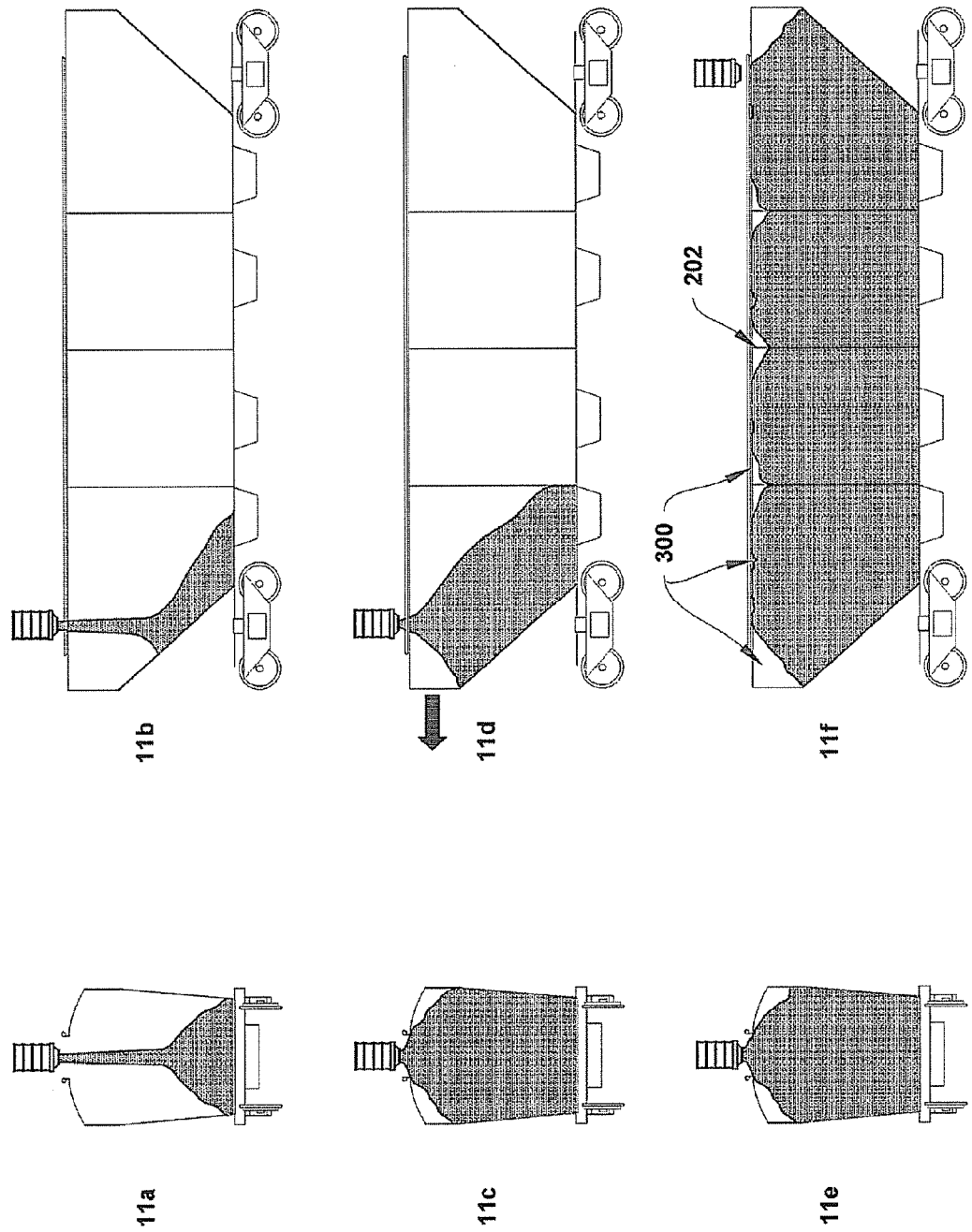
FIGS. 11a through 11f are schematic illustrations of a method of loading a transport container with particulate matter without employing an embodiment.

FIGS. 11a through 11f are schematic illustrations showing particulate matter piling up inside a transport container when loaded from a loading spout without employing an embodiment. FIGS. 11a and 11b illustrate particulate matter initially filling a transport container. FIGS. 11c and 11d illustrate a partially filled container, just prior to particulate matter overfilling the top of the container. Once particulate matter has formed a pile that reaches the loading spout, the loading spout is moved longitudinally relative to the container, in order to continue filling the container. This longitudinal movement can be accomplished by moving the loading spout while the container remains substantially stationary or by moving the container while the loading spout remains substantially stationary. In some loading arrangements, both the container and loading spout may move to continue filling the container with particulate matter. FIGS. 11e and 11f illustrate a full container loaded according to a conventional method. As illustrated in FIGS. 11e and 11f, voids 300 exist throughout the container in locations where particulate matter was unable to flow and fill the container completely. One cause of the voids may be that the feed rate of particulate matter from the loading spout is not consistent. An inconsistent feed rate changes the pace at which the loading spout or container be advanced, and may result in voids along the surface of particulate matter when that pace is not properly modulated. Voids at both ends of the container and about each internal wall 202 location, as well as voids occurring along the length of the container about the walls, may be due at least in part to the angle of repose of the particulate matter. When the loading spout is not moved to a new position along the container once the pile of particulate matter reaches the loading spout, particulate matter may build up inside of the loading spout and plug the system. Once the plugged loading spout is cleared, loading of particulate matter may be resumed. To avoid plugging, the loading spout may be moved before the pile of particulate matter reaches the spout, resulting in a container containing a lower volume of particulate matter.

Figure 12A:
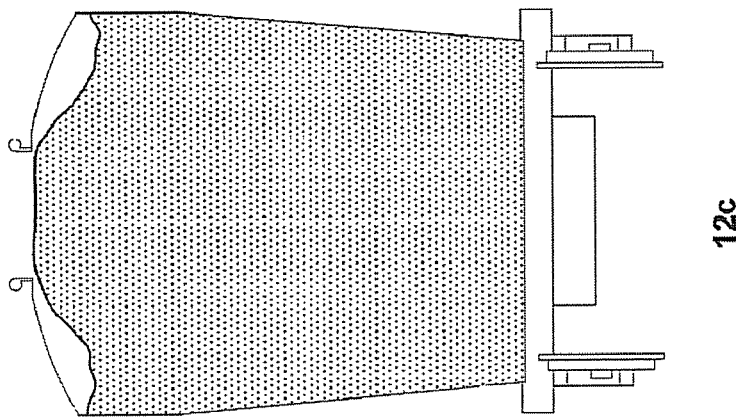
FIGS. 12a through 12c are simplified schematic end view illustrations of particulate matter loaded into a transport container not according to an embodiment, using a manual, iterative re-leveling process.
Figure 12B:
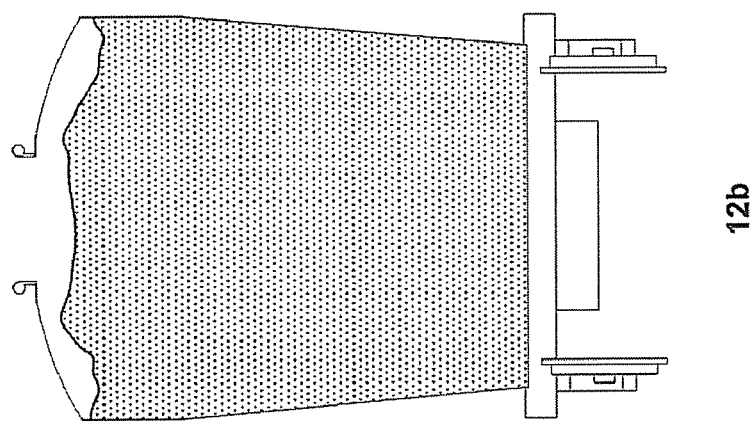
Figure 12C:
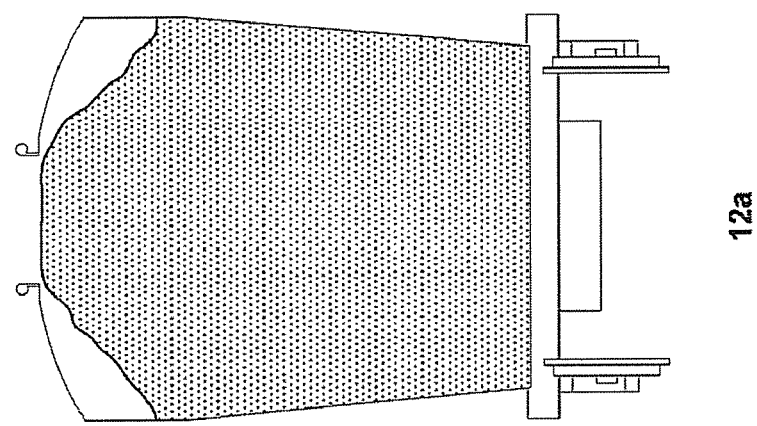

In order to load additional particulate matter into a container filled without an embodiment, a manual, iterative re-leveling process may be employed, in which particulate matter from the center of the container is shoveled from the apex of the pile into the transport container. After particulate matter is moved from the center of the pile, more particulate matter can then be added to the container until the apex again reaches the top of the opening. Subsequent iterations of the re-leveling process particulate matter can be employed as desired or until particulate matter from the apex can no longer be shoveled into the transport container. During each iteration of the re-leveling process, the flow of particulate matter into the container may be interrupted. FIGS. 12a through 12c are schematic illustrations of the iterative process of loading a container with particulate matter, releveling particulate matter in the container, and filling the container with additional particulate matter. FIG. 12a illustrates an end view of a container after it has initially been filled using the conventional loading method. FIG. 12b illustrates the container after particulate matter has been shoveled into the open areas of the container. FIG. 12c illustrates the container after additional particulate matter has been loaded. Although this process iterative, access to the voids is decreased with each iteration. With each of the loading and re-leveling iterations, the amount of particulate matter subsequently added to the container decreases.

Figure 13:
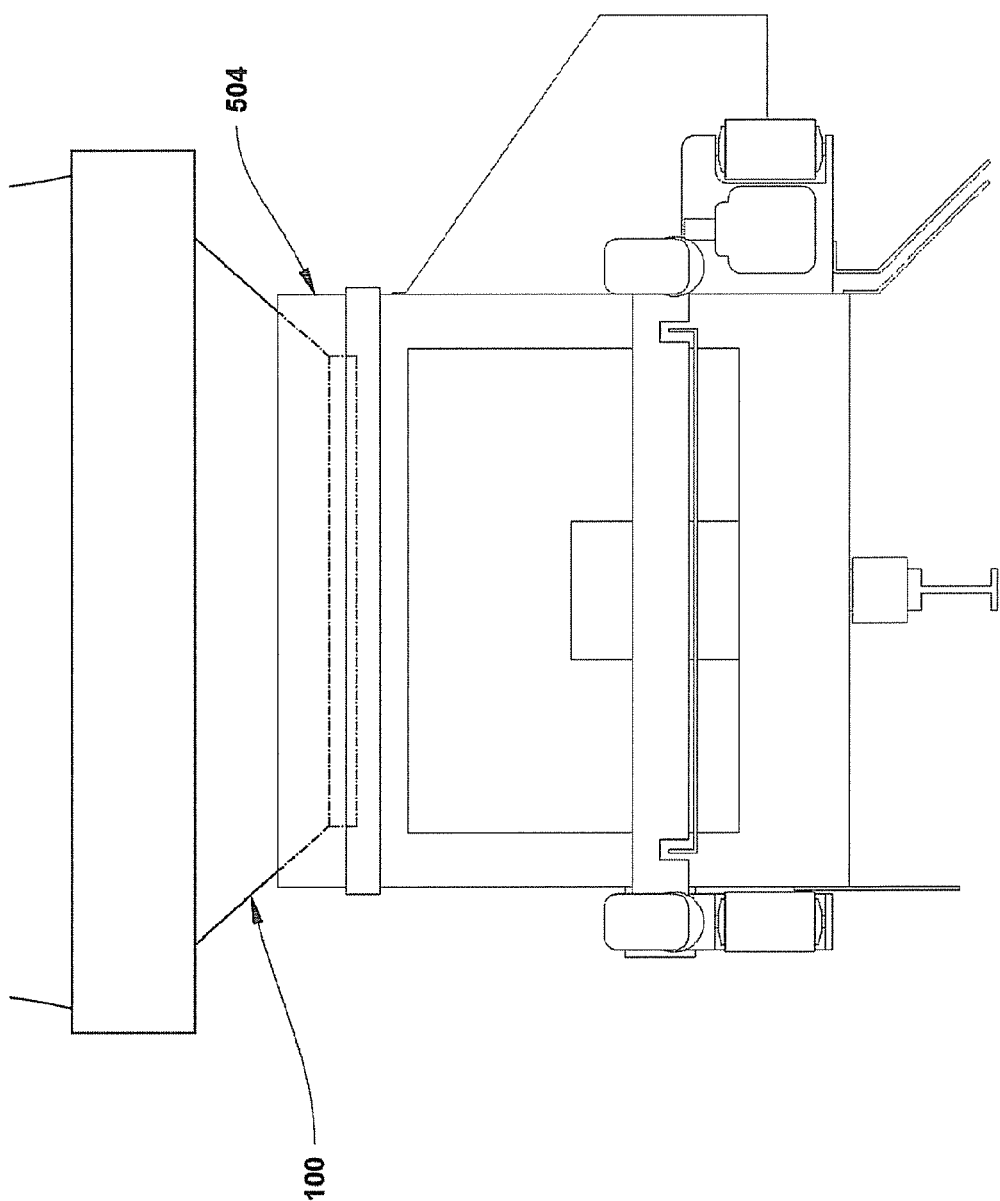
FIG. 13 is a schematic front view of an embodiment engaged by a loading spout.

According to an exemplary embodiment, the housing may comprise a chamber having a front and rear wall, two side walls, a top side, and a bottom side. The top side may form a top surface having an inlet for receiving particulate matter into the housing, as illustrated in FIG. 13. The top side may have a loading spout engagement ring 504 for engaging a loading spout to receive particulate matter from a silo or surge bin. The loading spout engagement ring may have a circular shape and may further comprise a flanged ring for receiving the tapered end of a loading spout 100. According to an embodiment, mounting brackets disposed on or near the top side may be used to couple the housing to the loading spout. These mounting brackets can be attached in such a way as to allow the loading apparatus to be transferable to other loading spouts. The engagement ring may be disposed outside the perimeter of the loading spout so that matter flowing from the loading spout into the housing is not deflected or otherwise obstructed by the engagement ring. According to an exemplary embodiment, the height of the engagement ring may be from approximately 1 inch to 2 inches to minimize the buildup of particulate matter around the ring. In an exemplary embodiment, a shroud surrounds the loading spout such that the loading spout fits within the engagement ring and both the loading spout and the engagement ring are surrounded by the shroud.

The loading apparatus can include an adjustable guide assembly for adapting the apparatus to fill transport containers having openings with different widths. As shown in FIGS. 14a through 14d, an exemplary embodiment of the adjustable guide assembly 600 comprises one or more wheels mounted on brackets, such that each bracket can be positioned (e.g., slid into place, rotated into place) as needed can be adjusted to fit an opening of a particular width and secured in place using a pin or similar device. In FIGS. 14a and 14b, an embodiment is shown configured for a narrow transport opening. In FIGS. 14c and 14d the guide assembly is adjusted to accommodate a container opening having a 6 inch greater width. In one embodiment, the guides are permanently attached to the apparatus and can be slid to a position appropriate for the container being loaded. In an exemplary embodiment, one or more brackets of the adjustable guide assembly can rotate around a fixed point, such that the bracket can be positioned in one of four quadrants, each utilizing a different offset, to fit a variety of transport container openings. According to an even further embodiment, elements of the adjustable guide assembly may be replaced, instead of adjusted, to fit a variety of transport container opening shapes and widths.

According to an exemplary embodiment, the adjustable guide assembly does not extend from the housing a distance greater than would allow the loader to push the particulate matter effectively into the voids while also densifying the particulate matter.

Figure 15A:
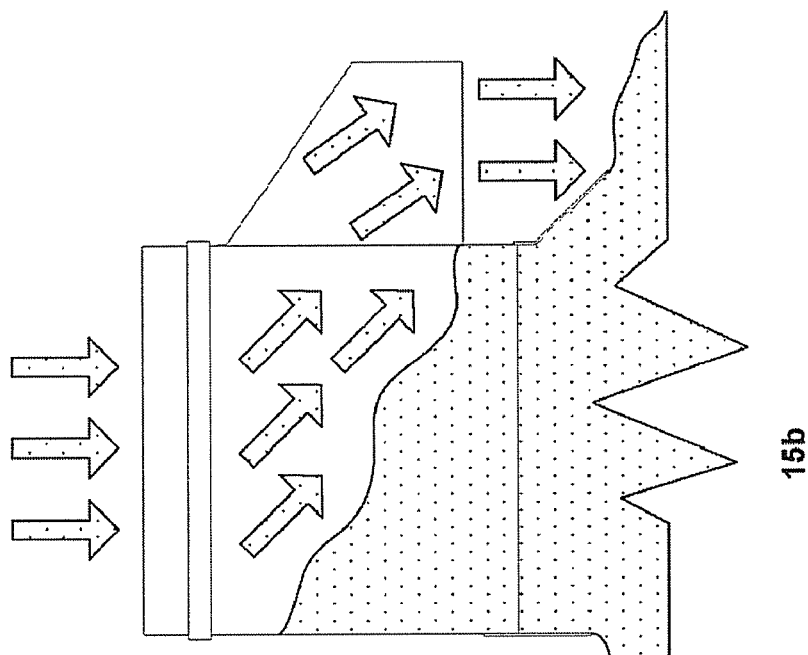
FIGS. 15a through 15b are simplified schematic views illustrating the operation of a bypass path of an embodiment.
Figure 15B:
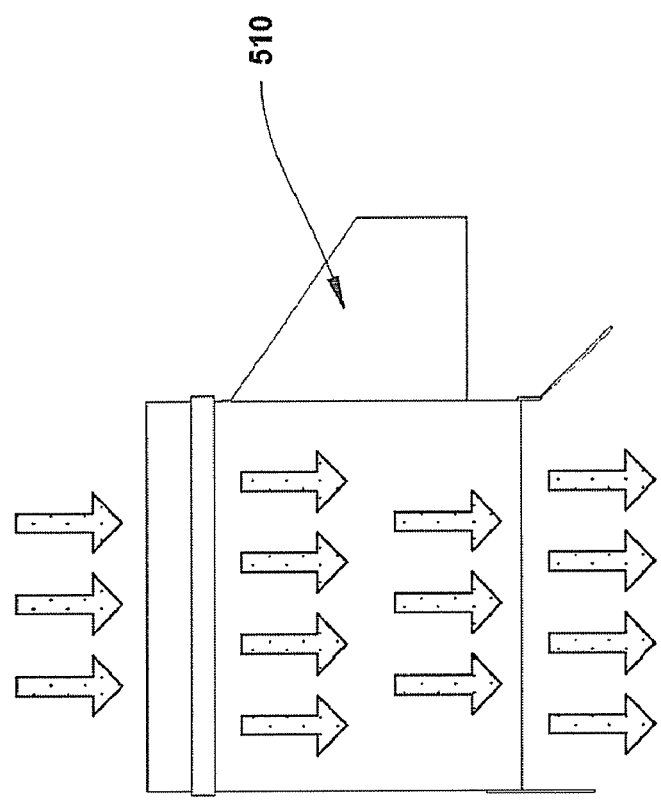

A rotatable member of a loading apparatus according to an embodiment, immersed in a pile of particulate matter, is intended to exert oscillating force on particulate matter until the loading apparatus is advanced, or until particulate matter accumulates in the loading apparatus. In an exemplary embodiment, a bypass path 510 may be located on the front side of the loading apparatus, as illustrated in FIG. 15a through 15b. The normal path of the particulate matter through the loading apparatus is shown in FIG. 15a. The bypass path provides a path to relieve excess particulate matter that would otherwise accumulate in the housing of the loading apparatus when the outlet is obstructed. FIG. 15b illustrates the relief path provided by the bypass path. While particulate matter flows through the bypass path, the rotatable member can to continue to rotate, applying the oscillating force on particulate matter already in the transport container and further densifying the particulate matter.

Figure 16:
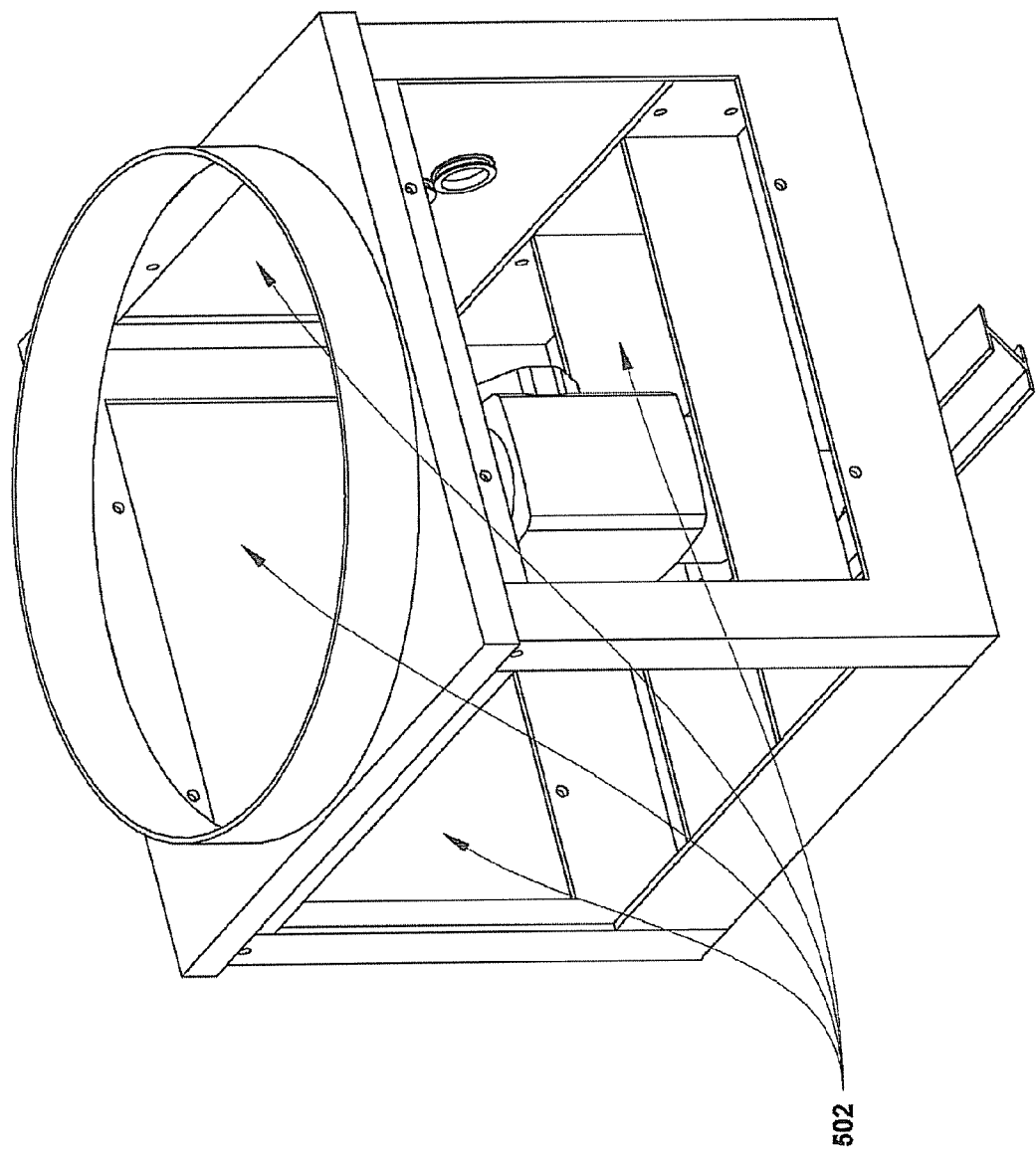
FIG. 16 is a simplified schematic perspective front-side view of an embodiment.

In one embodiment, shown in FIG. 16, a viewing window 502 of polycarbonate or other substantially transparent material may be incorporated into either of the front, rear, side walls, intended to enable an operator to visualize activity within the housing during operation. By observing activity within the housing during operating, it is intended that the operator may monitor the flow of particulate matter and troubleshoot any plugging or equipment operation errors that may occur.

Figure 17A:
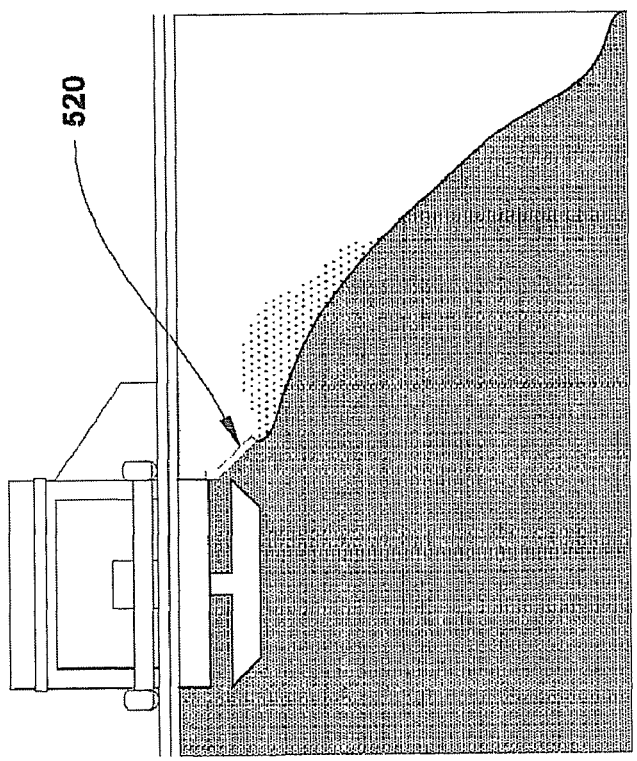
FIGS. 17a through 17b are simplified schematic side views of an embodiment, illustrating the function of the deflector.
Figure 17B:
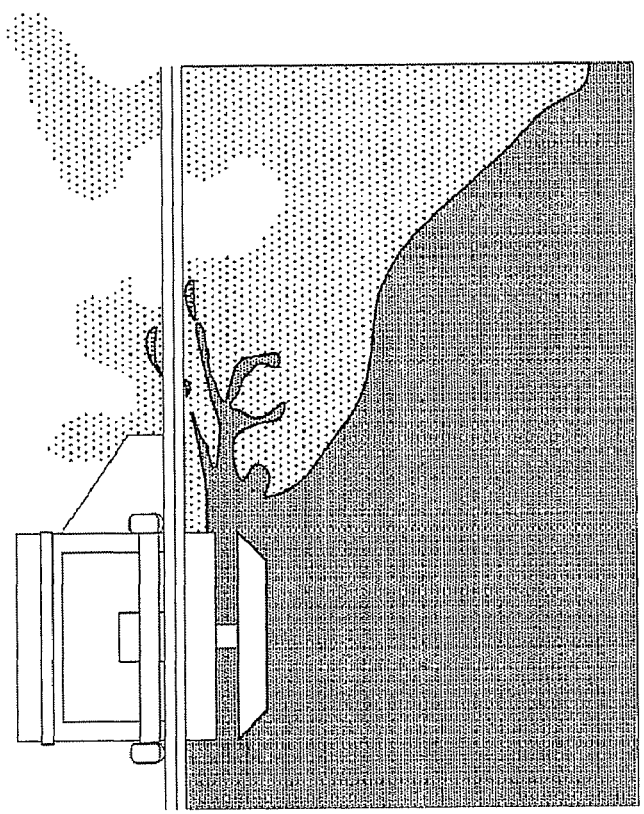

According to an exemplary embodiment, a deflector 520 is mounted to the front of the housing in order to prevent particulate matter from being thrown out of the pile in the transport container when the rotatable member is rotating, as schematically shown in FIGS. 17a and 17b. This function is intended to reduce dust generated during the loading of particulate matter. FIG. 17a illustrates particulate matter coming off the face of the rotatable member, creating dust. FIG. 17b illustrates the deflector preventing particulate matter from leaving the container, thereby minimizing the generation of dust. The deflector can be made of a material that does not bend or give under the force of particulate matter, such as fiberglass, a rigid plastic, carbon steel, or other metal alloy. In an exemplary embodiment using a rigid deflector, the deflector may act as a barrier to particulate matter coming off the face of the rotatable member, increasing the oscillating force generated by the spreader against the particulate matter and increasing the amount of densification imparted on the particulate matter. In an embodiment, the width of the deflector is adjustable for containers having openings of various widths and shapes. According to an exemplary embodiment, a deflector 522 can be mounted at rear of the housing. The deflector may be flexible to allow it to ride on top of the particulate matter piled in the container as particulate matter builds up behind the loading apparatus and the loading apparatus moves forward along the container. In another embodiment, the deflector is rigid and extends out behind the loading apparatus to shield the opening and prevent particulate matter from leaving the container.

Figures 18A, 18B, 18C, 18D:
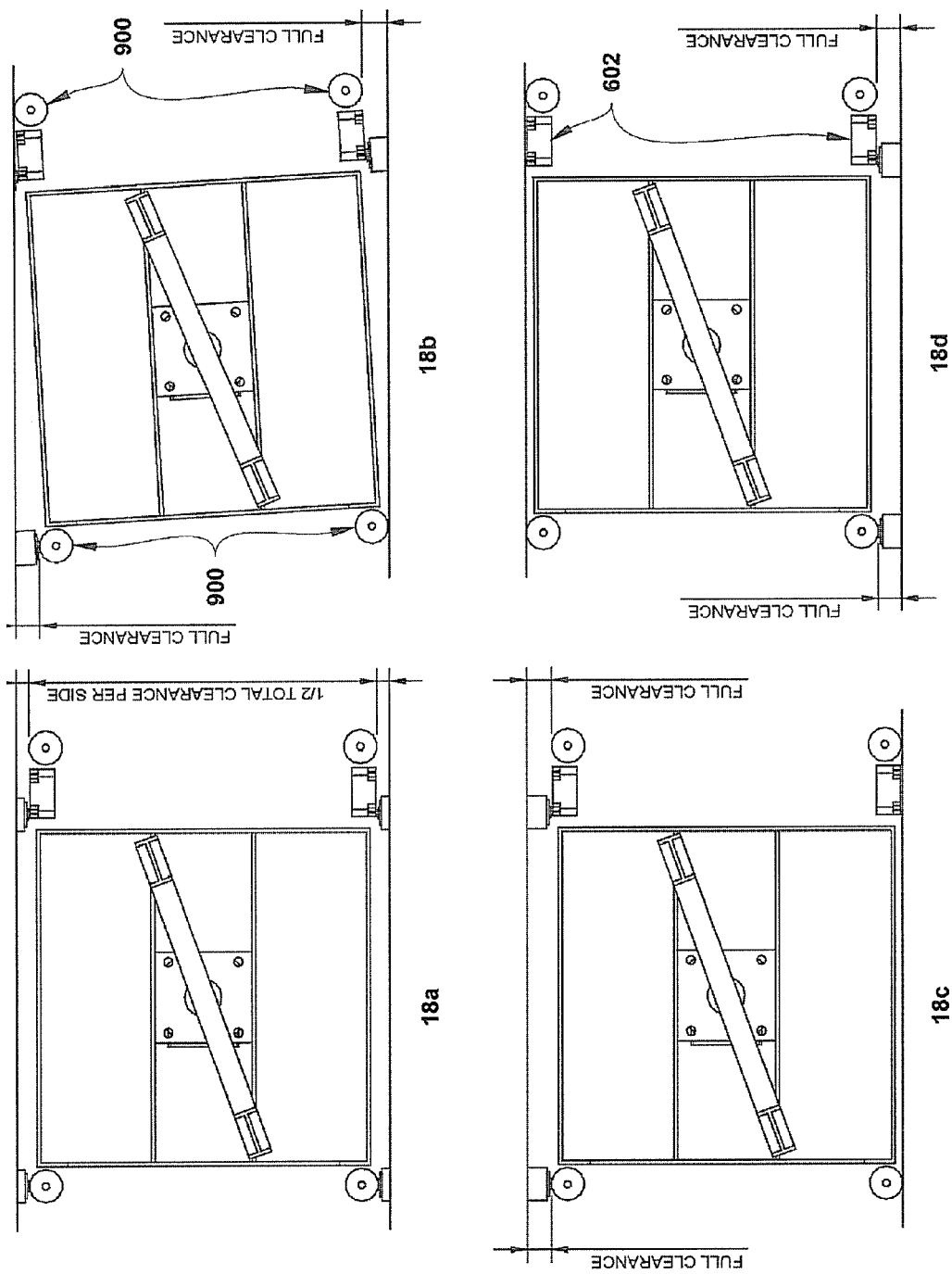
FIG. 18a through 18d are simplified schematic top views of an embodiment, illustrating the guide members and sensors.

In known transport containers (e.g., railcars), the opening may be elongated and have doors that hinge on their longitudinal edge. Clasps opposite the hinges may be used to retain the doors in a closed position. When opened, the doors may swing away from the opening and rest adjacent to the opening. The hinges and clasps may extend higher than the opening, creating barriers to longitudinal travel of an embodiment down the opening, as portions of the embodiment may contacting these hinges and clasps. In some cases railcars may be damaged, having an opening with an inconsistent width. Guides may be used on the loading apparatus, intended to enable longitudinal movement by limiting the interference of the embodiment with clasps and hinges on the railcar and maximizing the maneuverability of the loading apparatus within railcars having damaged openings of varying widths. As shown in FIGS. 18*a* through 18*d*, guides are mounted at each corner of the housing to guide the loading apparatus within the opening of a transport container. FIG. 18*a* shows a standard operating position of the loading apparatus centered inside the container opening, according to an embodiment. FIGS. 18*b*, 18*c*, and 18*d* show the guides positioned to limit the lateral movement of the loading apparatus. In one embodiment, these guides are wheels 900 mounted vertically. Using vertical wheels limits the friction between the loading apparatus and the container to aid loading apparatus movement in the opening of the container. In an embodiment, these vertical wheels are mounted to adjustable guides so that the position of the wheels can be modified as needed to accommodate containers with different opening widths and shapes. In an exemplary embodiment, the wheels have sealed bearings to limit friction.

According to an embodiment, the loading apparatus includes one or more sensors to prevent the apparatus from operating unless the lower edge of the housing is engaged with, or near, the rail car, as shown in FIG. 18*a* through 18*d*. The sensors are intended to aid operator safety by preventing the operation of the loading apparatus when the rotatable member is not disposed within the container. According to an embodiment, the sensors 602 are connected via a series circuit so that a single sensor cannot be defeated and allow the system to run. The sensors may be mounted to the loading apparatus at a position inside of the rails, and may detect a horizontal distance between the sensor and the rails. The sensors enable the loading apparatus to run when the detected distance within a range distances such that the rotatable member is substantially disposed inside the container. According to an embodiment, the range of distances within which the loading apparatus may operate is such that the loading apparatus can be operated with the wheels resting on the opening or hovering just above the container. The sensors can also be mounted horizontally above the edges of the container opening so that a vertical distance is detected between the sensor and the rails, according to an embodiment. In another embodiment, a mechanical switch can be used to enable the loader apparatus to run when the switch engages the rail. In one embodiment, the sensors are mounted to adjustable or removable guides so that the safe operating distance can be adjusted as needed to accommodate containers with different opening widths.

Figure 19:
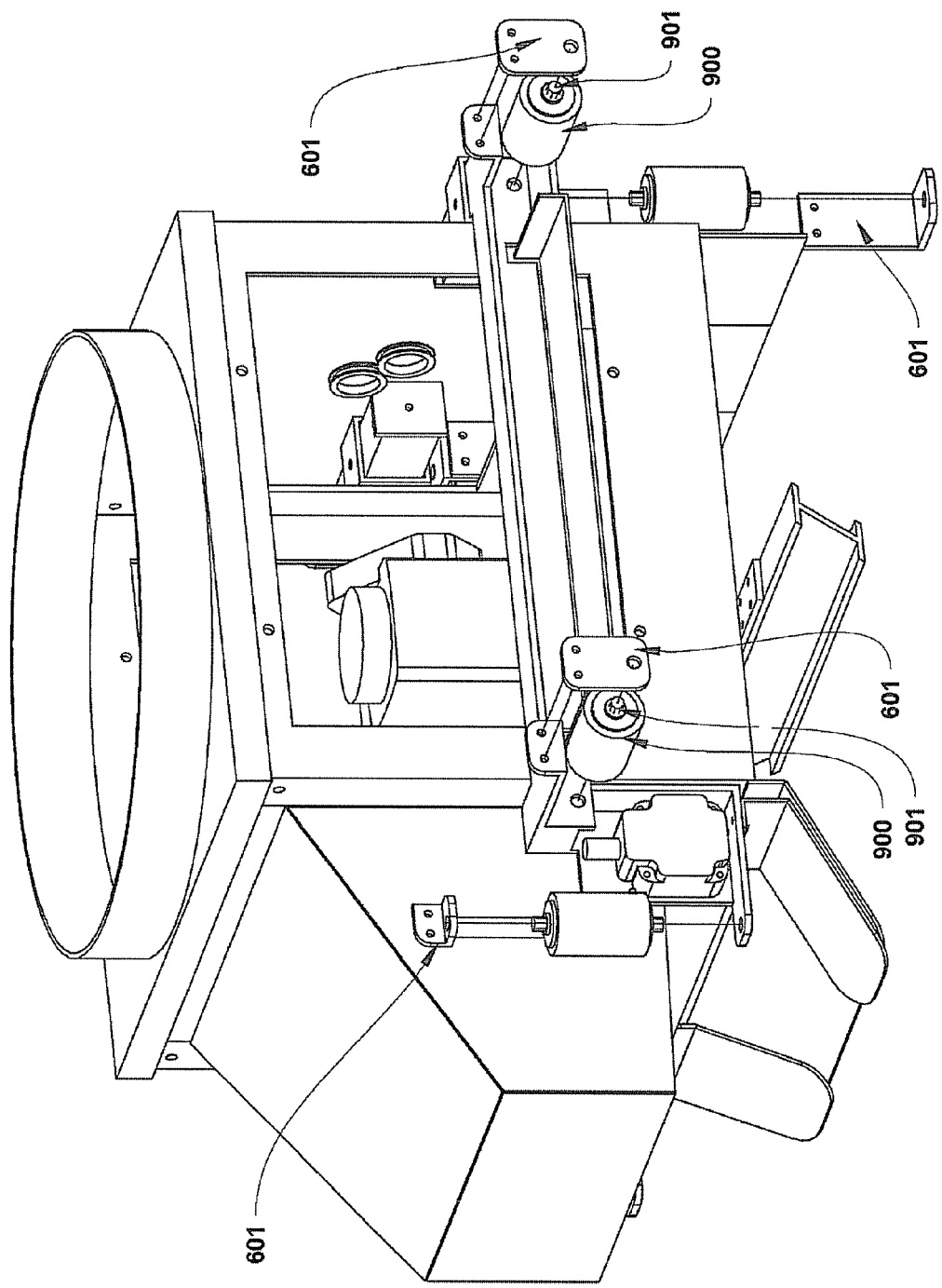
FIG. 19 is a schematic perspective front-side view of an embodiment, illustrating the functionality of the guide wheels.
Figure 20:
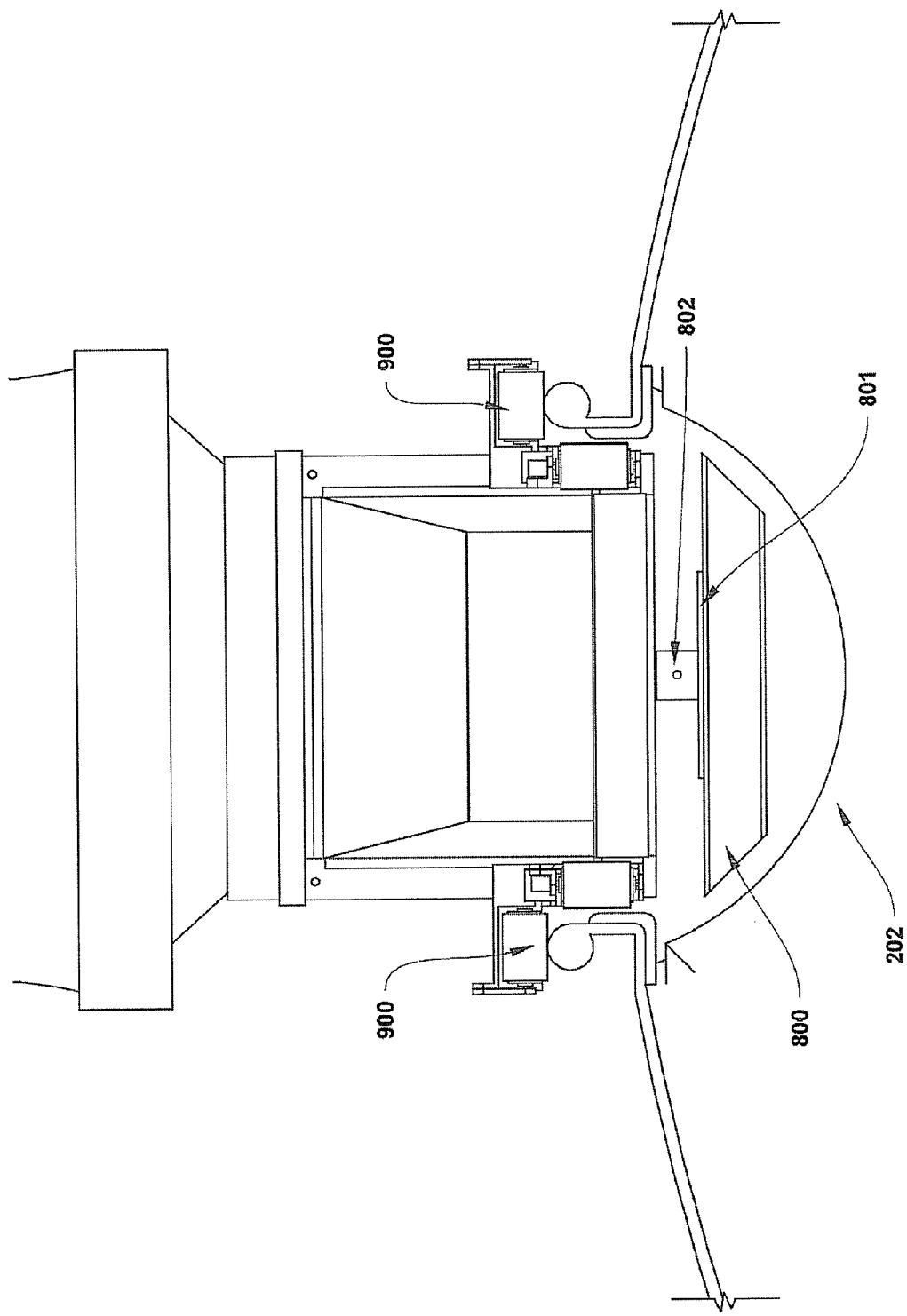
FIG. 20 is a schematic cross-sectional view illustrating an embodiment mounted on a transport container.

According to an embodiment shown in FIGS. 19 and 20, the loading apparatus can employ wheels 900 for supporting the apparatus on the opening of a container. The wheels can also support the weight of the loading apparatus, loading spout, and impinging particulate matter within both the loading apparatus and loading spout. According to an embodiment, the wheels are attached to the loading apparatus, and can be replaceable. FIG. 19 is a schematic drawing showing an embodiment with replaceable support wheels and guide wheels in which replacement of the wheels is accomplished by loosening attachment bolts and removing a bracket 601 holding each of the wheels in place. In another embodiment, the axle 901 of each wheel may be spring loaded so that the wheels can be removed without removing the brackets 601. A motor may be employed to drive the wheels for moving an embodiment along the opening of the container as it is being filled. In one embodiment, the speed at which an embodiment is driven along the opening could be controlled with a trigger that enables forward motion of the embodiment when particulate matter flows through the bypass path.

Figure 21:
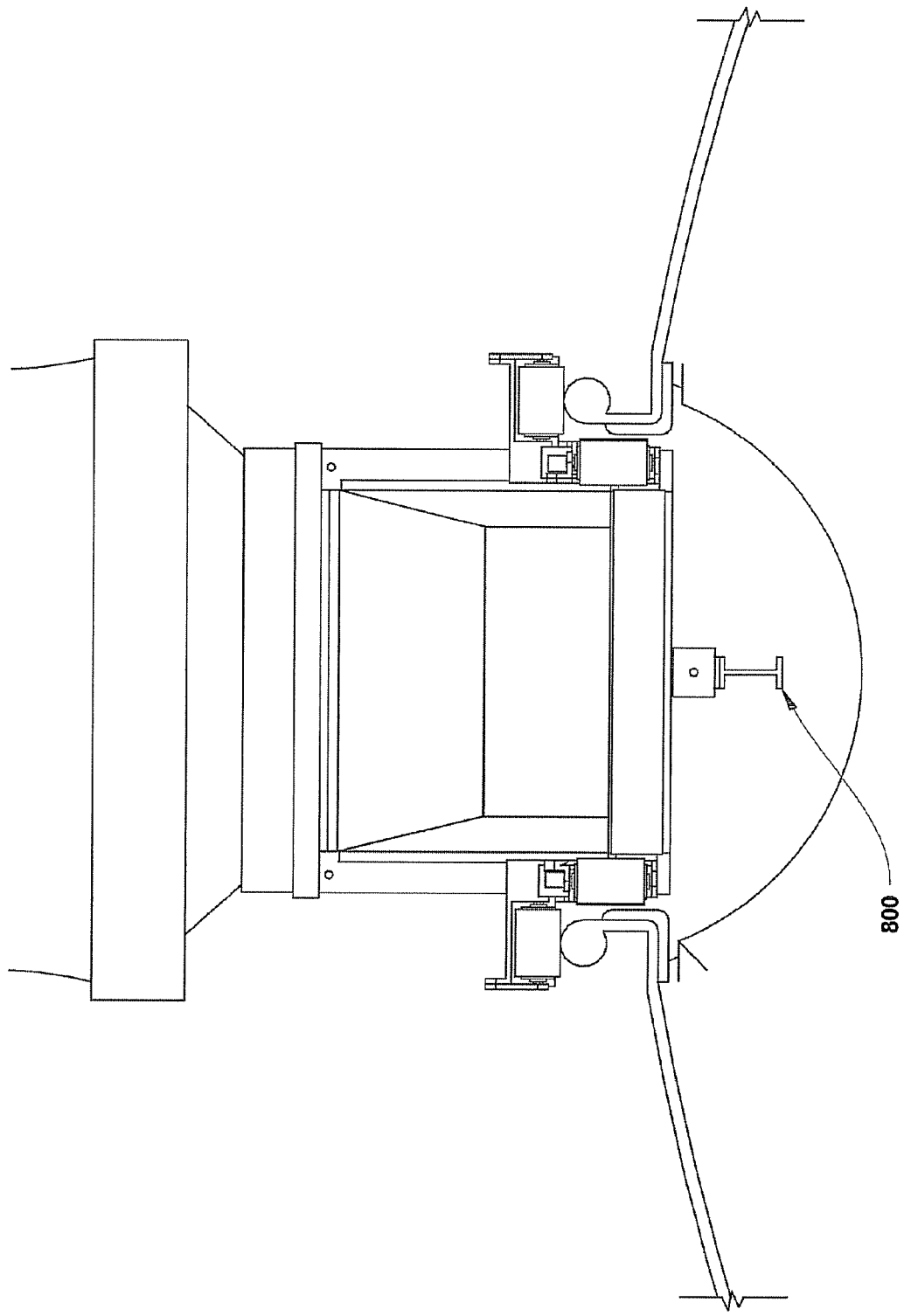
FIG. 21 is a schematic cross-sectional view illustrating an embodiment mounted on a transport container showing the functionality of a rotatable member oriented to pass through an opening of an inner wall.

A rotatable member 800 is shown in FIGS. 20 and 21, according to an embodiment. Although the rotatable member is depicted as an elongated member with a substantially I-shaped cross section in the figures, it will be appreciated by one skilled in the art that many types of elongated members could be used to spread particulate matter. According to an exemplary embodiment, if the particulate matter being loaded were to exhibit the characteristic of being compressed, the rotatable member could incorporate an angled surface to push down and compress the matter. According to another exemplary embodiment, the rotatable member can be mounted horizontally, or in such a fashion that it is angled off of the horizontal plane to alter the direction of force is applied to the particulate matter.

The rotatable member 800 can be produced of various materials, including carbon steel, stainless steel, and brass. Non-metallic materials, such as fiber glass may selected to avoid metal to metal contact in situations where sparking is undesirable. In an embodiment, the rotatable member is configured so that particles are displaced in a substantially horizontal manner towards the side walls of the container. The rotatable member displaces particles radially below the housing and inside the container. The rotatable member may be rotated clockwise or counter-clockwise. In one embodiment, the rotatable member 800 may have a substantially I-shaped cross section, centered on a hub 802 on a rotating shaft. In an exemplary embodiment, the rotatable member can be attached to a mounting plate 801 which may be affixed to the hub 802. The rotatable member may be removable from the mounting plate for replacement if damaged or worn. The size of the rotatable member can be chosen with consideration to the container's opening, the lateral mobility of the loading apparatus as it travels along the opening of the container, and the properties of the matter being loaded. According to an exemplary embodiment, the rotatable member may be at least one inch shorter than the width of the opening. When used with containers having internal walls 202, shortening or mitering the rotatable member is intended to enable the rotatable member to avoid contacting the internal walls during operation, as the apparatus passes through an opening in the internal wall from one chamber to the next. It has been observed that the rotatable member length is related to the desired additional quantity of particulate matter to be loaded into a container. For example, an embodiment having a shorter rotatable member can be configured to similarly load particulate matter into a container as an embodiment having a longer rotatable member when the shorter blade is rotated at a higher rate.

Figure 22:
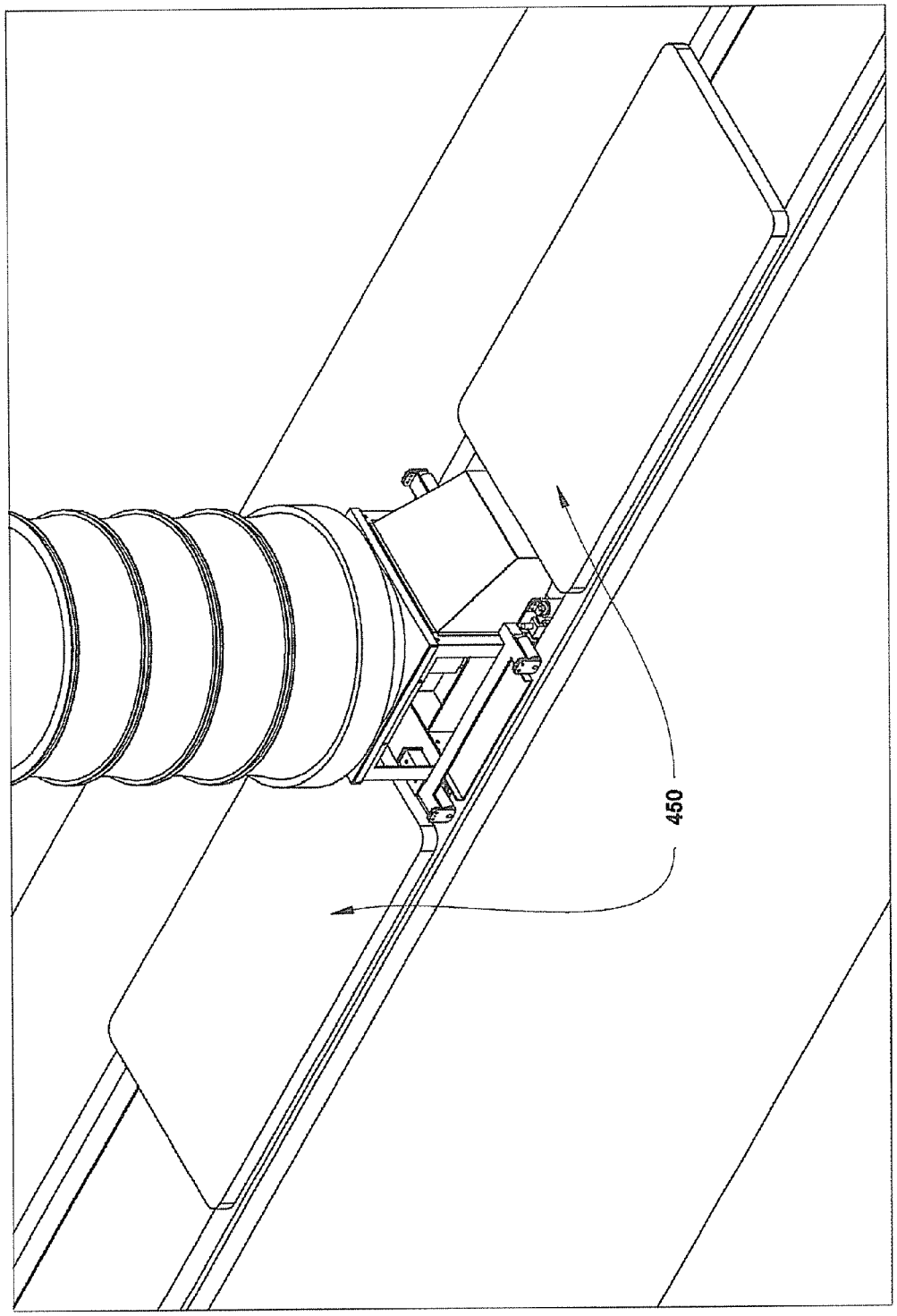
FIG. 22 is a perspective front-side view of an embodiment having covers to selectively block the opening, according to an embodiment.

According to an embodiment, controls may be incorporated into the system that are intended to orient the rotatable member in a specific position. A sensor mounted on the leading side of the loading apparatus may be used to sense an internal wall between chambers of a container. Upon sensing the internal wall, the control system may stop the rotatable member and position the member 800 in an orientation that will allow the apparatus to pass beyond through the opening in the internal wall without the rotatable member contacting the internal wall, as shown in FIG. 21. An embodiment employing these controls can employ a rotatable member having a length greater than the width of the container opening, or the width of the opening in the internal wall, as the blade can be orientated to pass through the container opening and openings in the internal walls without contacting them. Use of a longer rotatable member is intended to spread particulate matter more fully throughout the container. According to an embodiment, a blade-orientation control system is intended to enable the rotatable member to be run at a lower elevation inside of the chamber without sacrificing rotatable member length to accommodate for the radius of the opening in the internal wall. It has been observed that a shorter rotatable member may be operated at a comparatively greater rotational speed than a longer rotatable member to match the performance of the longer rotatable member. Increased rotational speed is intended to increase the density (e.g., bulk density) at which matter in the container is compacted, but can also increase the amount of dust created by the system. In an embodiment as shown in FIG. 22, covers 450 are shown, intended to minimize the amount of particulate matter and dust that leave the container in front of and behind the loading apparatus. Choice of spread blade angular velocity depends on the physical properties of the matter being loaded.

Figure 23:
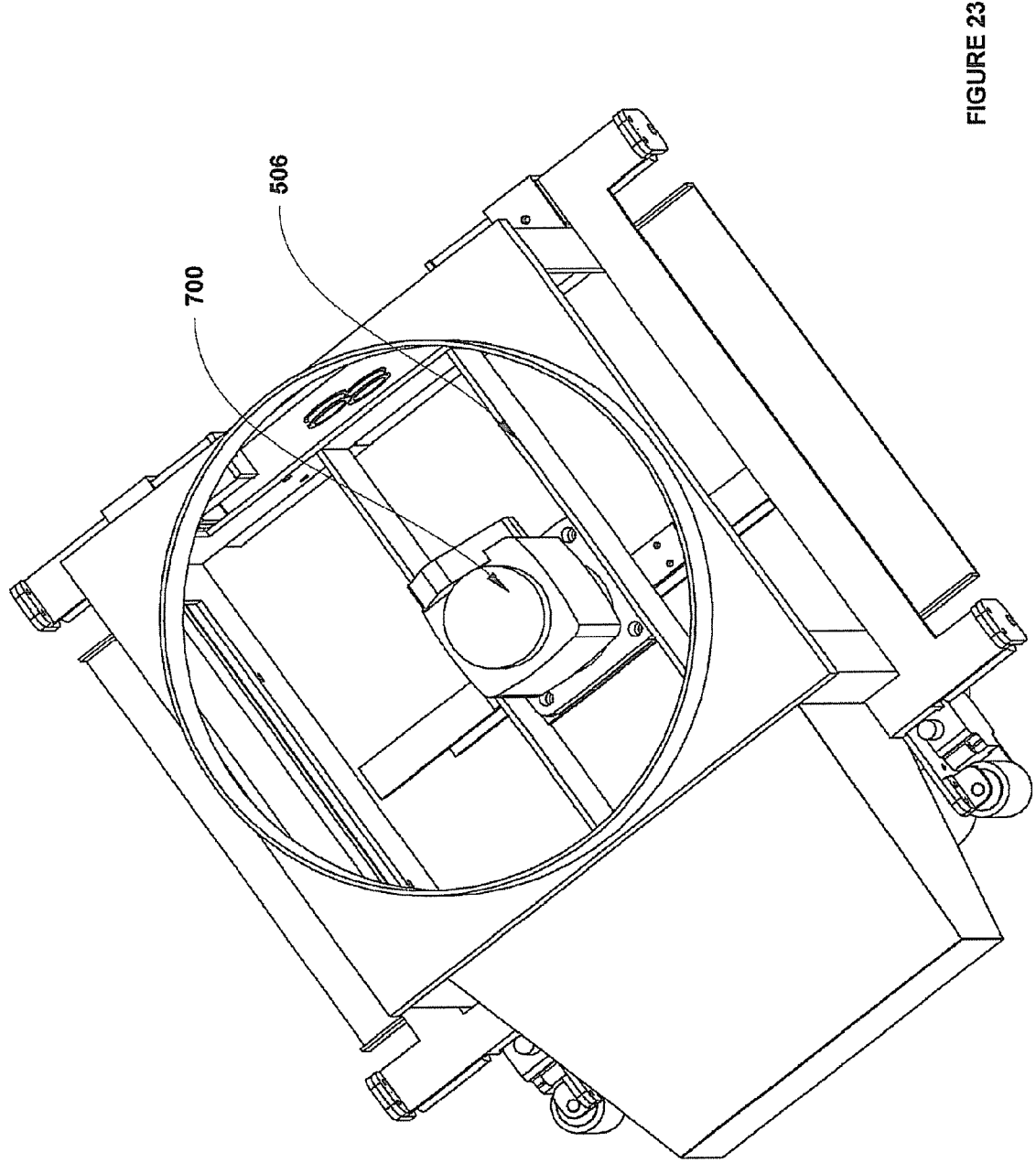
FIG. 23 is a schematic perspective top-side view of an embodiment, illustrating a center mounted motor.
Figure 24:
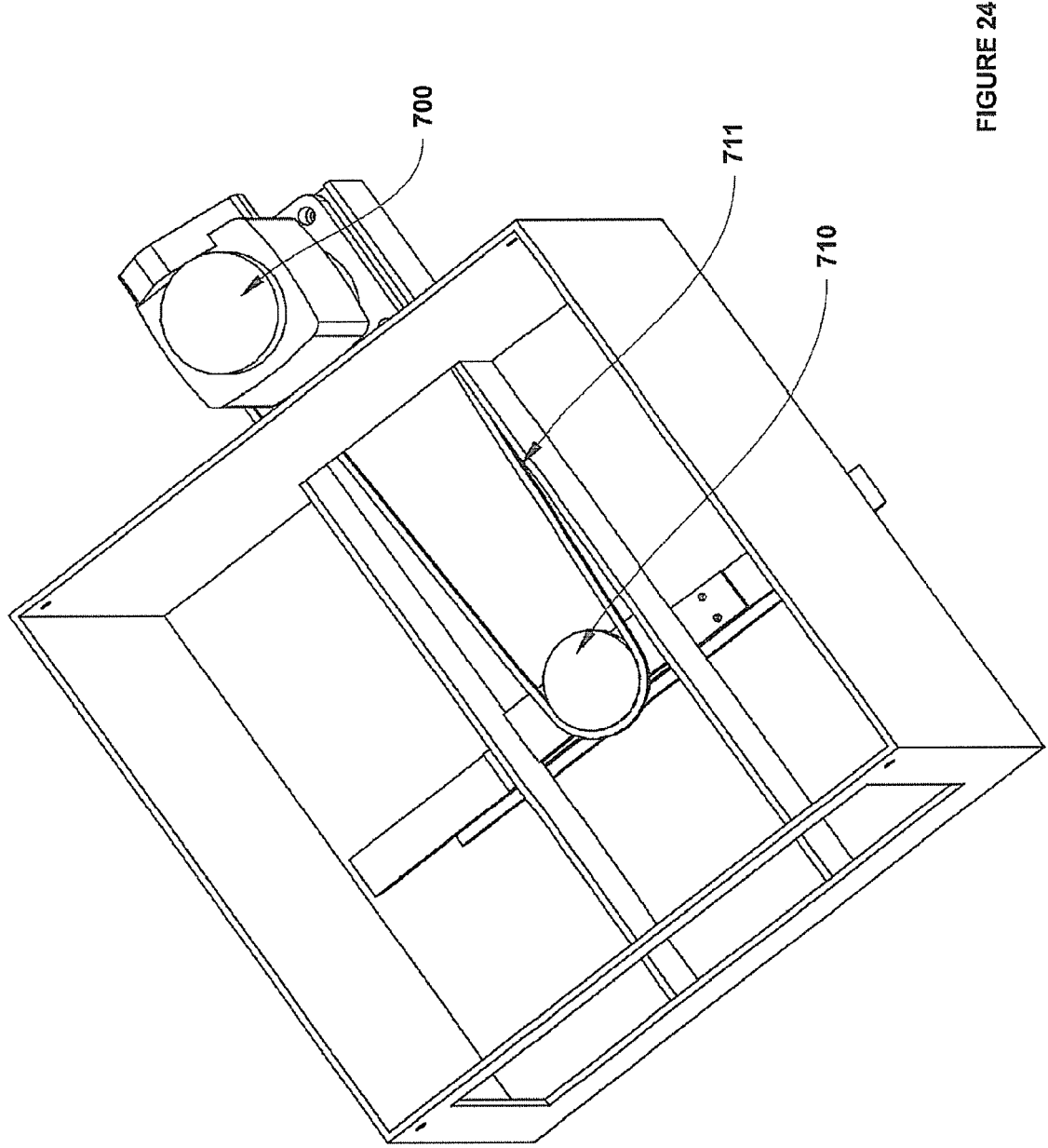
FIG. 24 is a schematic perspective top-side view of an embodiment, illustrating a belt drive or chain drive.
Figure 25:
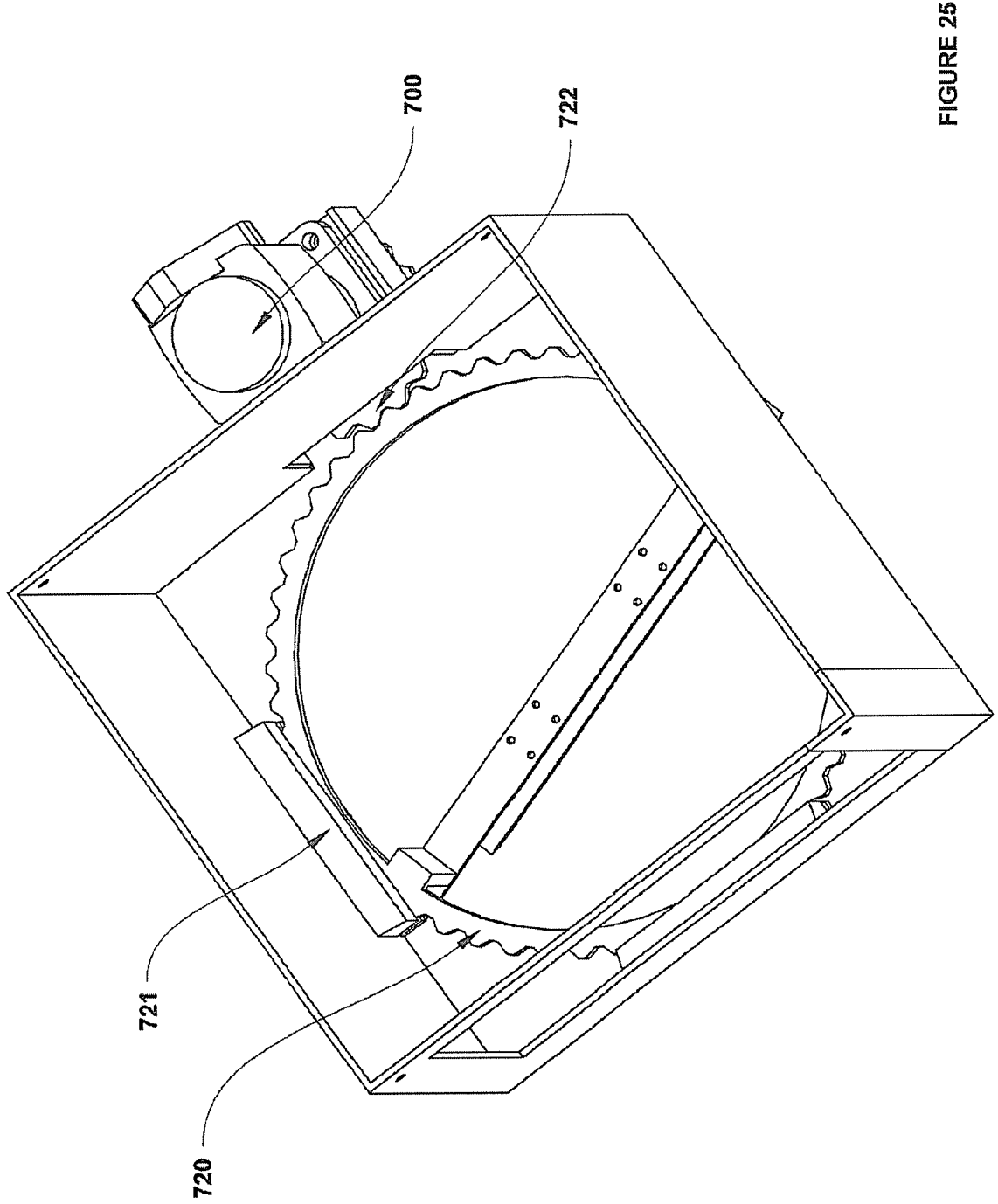
FIG. 25 is a schematic perspective top-side view an embodiment, illustrating a gear drive.
Figure 26A:
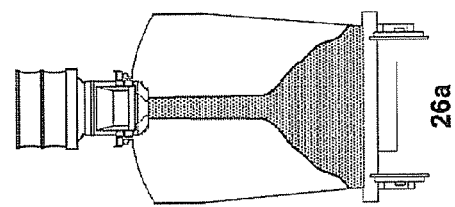
FIGS. 26a through 26f are schematic views illustrating densification of particulate matter through the oscillating force exerted on the matter by the rotatable member, according to an embodiment.
Figure 26B:
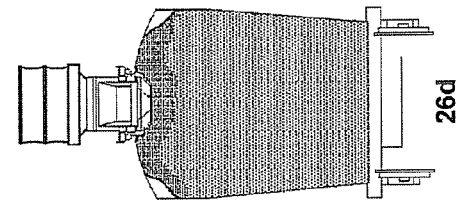
Figure 26C:
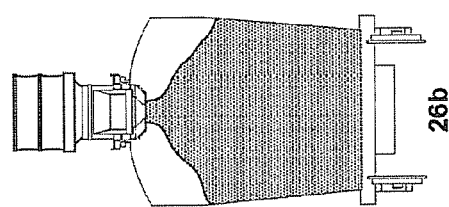
Figure 26D:
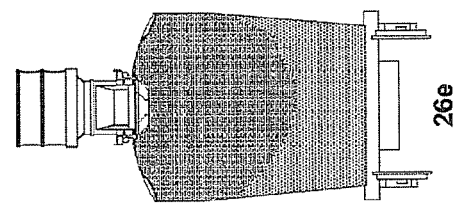
Figure 26E:
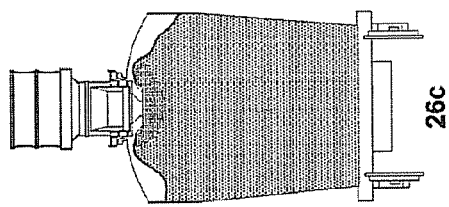
Figure 26F:
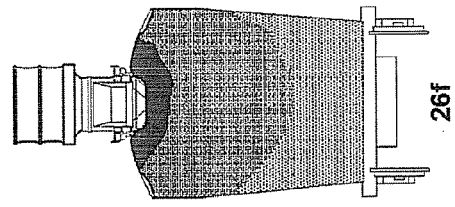

FIG. 23 shows the motor 700 located within the housing of the loading apparatus supported by mounting braces 506, according to an embodiment. This motor can be a hydraulic, pneumatic, or electrical motor and can be operated at a fixed or variable speed. In one embodiment, the motor is located outside the housing as shown in FIGS. 24 and 25. In an embodiment using a motor located outside the housing, it may be desirable to counter balance the motor weight to maintain a balanced device. In another embodiment, the rotatable member may be mounted to a pulley or gear 710 driven by a chain or belt 711 that is powered by the external mounted motor 700, as shown in FIG. 24. FIG. 25 shows an embodiment employing a ring gear 720 mounted to the housing by a bearing housing 721. The ring gear may be driven by a spur gear 722 mounted to the shaft of the motor 700. The rotatable member may then mounted to the ring gear.

According to an embodiment, the speed of the rotatable member may be varied based on the level of particulate matter in the container, the location of the loading apparatus along the container, and the characteristics of the matter being loaded. Lower speed operation is intended to reduce dusting, and higher speed operation is intended to maximize loading.

According to an embodiment, while the container is initially filled as shown in FIGS. 6a and 6b, stratification of densities may occur across through the depth of the container, as shown in FIG. 26a through 26f. The oscillating force of the rotatable member is only able to densify particulate matter while immersed in the particulate matter. According to one embodiment, this stratification is intended to be overcome by lowering the loading apparatus into the container to a depth were the rotatable member will be immersed in the matter at it fills the chamber. As the level of particulate matter rises, the depth of the loading apparatus may be adjusted accordingly to maintain a densifying effect as the container is filled as shown in FIG. 27a through 27f. In an exemplary embodiment, the loading apparatus remains stationary on the opening while the initial filling of the container takes place. The rotatable member may then be lowered to the level of particulate matter as desired to densify matter as it fills the chamber.

Figure 28A:
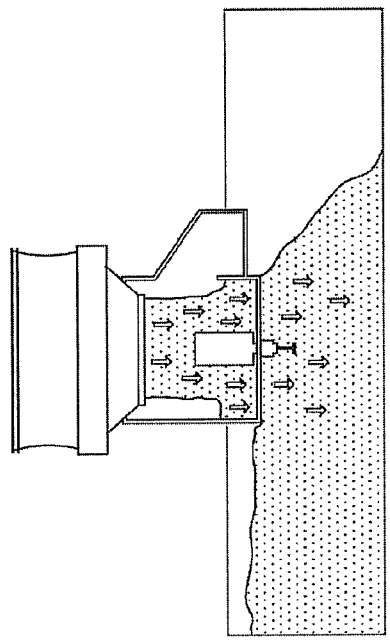
FIGS. 28a through 28d are simplified schematic views illustrating the operation of a bypass path of an embodiment.
Figure 28B:
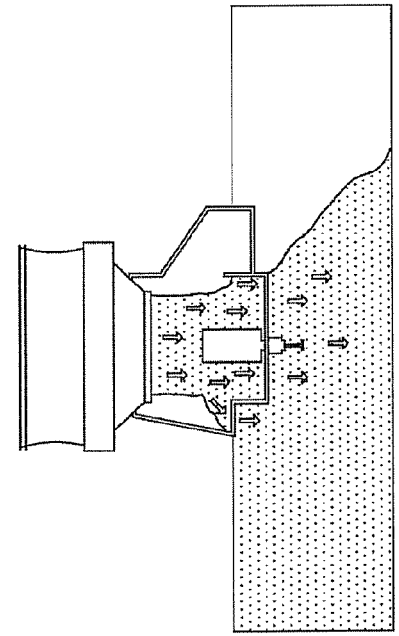
Figure 28C:
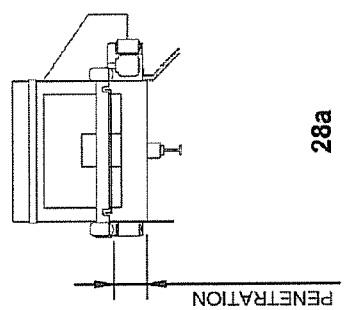
Figure 28D:
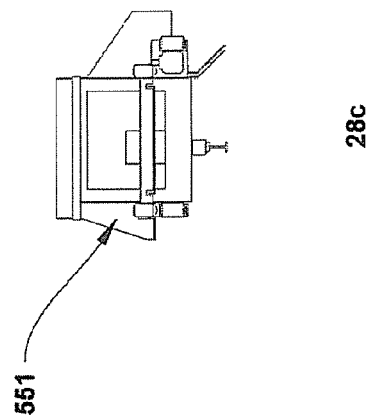

FIGS. 28a and 28b illustrate the penetration depth of the housing that defines the finished level of particulate matter, according to an embodiment. According to an embodiment, the rear wall of the housing includes a chute defining an opening configured to divert a portion of particulate matter as it flows through the housing as shown in FIG. 28c. The chute 551 is configured to direct the diverted particulate matter to fall on top of the particulate matter behind the loading apparatus as shown in FIG. 28d. The chute acts as a screeding device to control the finished level of particulate matter in the transport container. According to an exemplary embodiment, the trailing edge of the chute can be adjusted to change the height of the finished level. In an even further embodiment, the trailing edge of the chute can be adjusted to produce a finished level at a height substantially equal to the height of the opening. An apparatus with a chute according to an embodiment enables an increased loading of particulate matter into the transport container compared to an embodiment without a chute.

Figure 29:
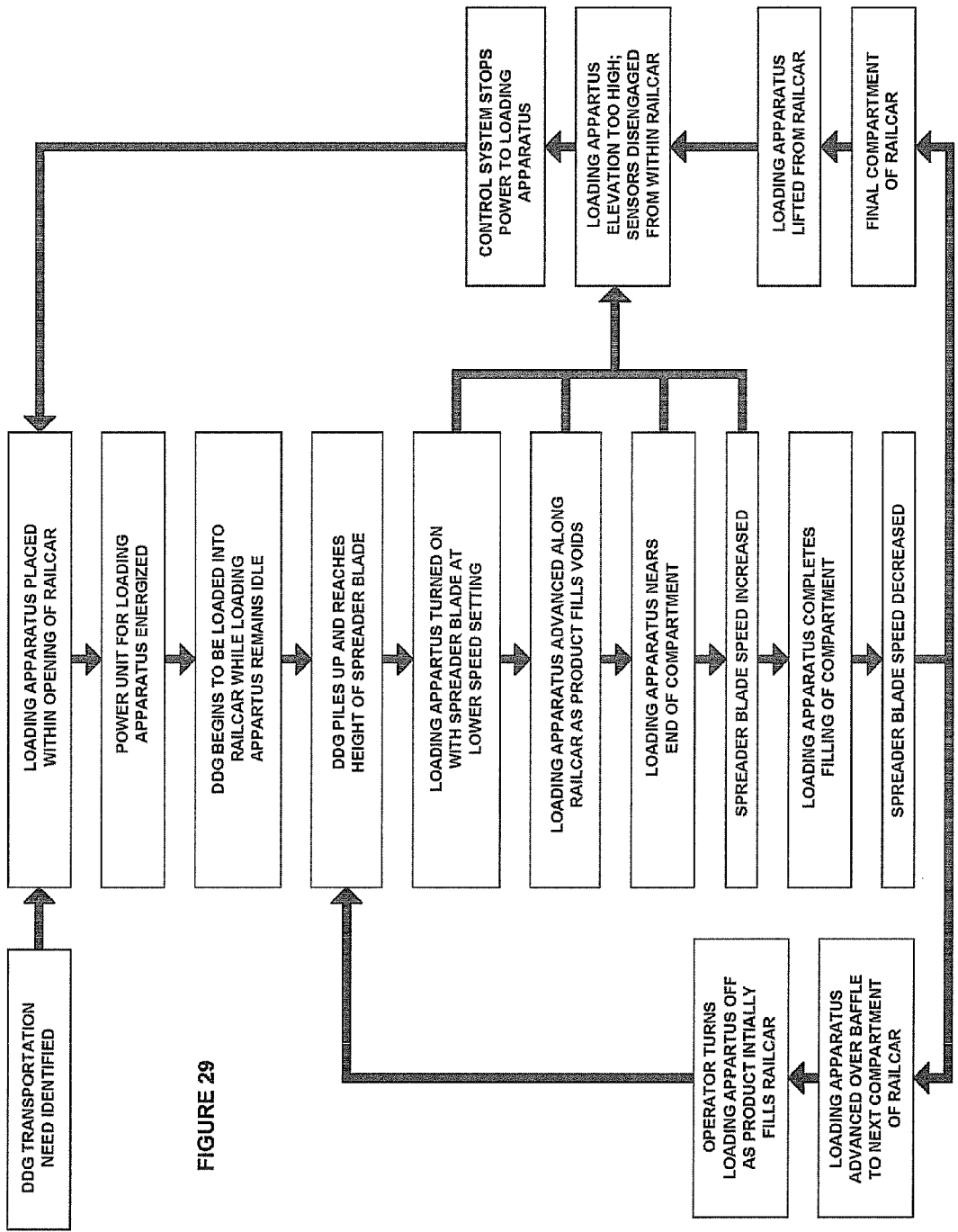
FIG. 29 is a process flow diagram illustrating a method of operating an embodiment.

FIG. 29 shows the process flow diagram of procedures followed to operate the loading apparatus in one embodiment.

Figure 30:
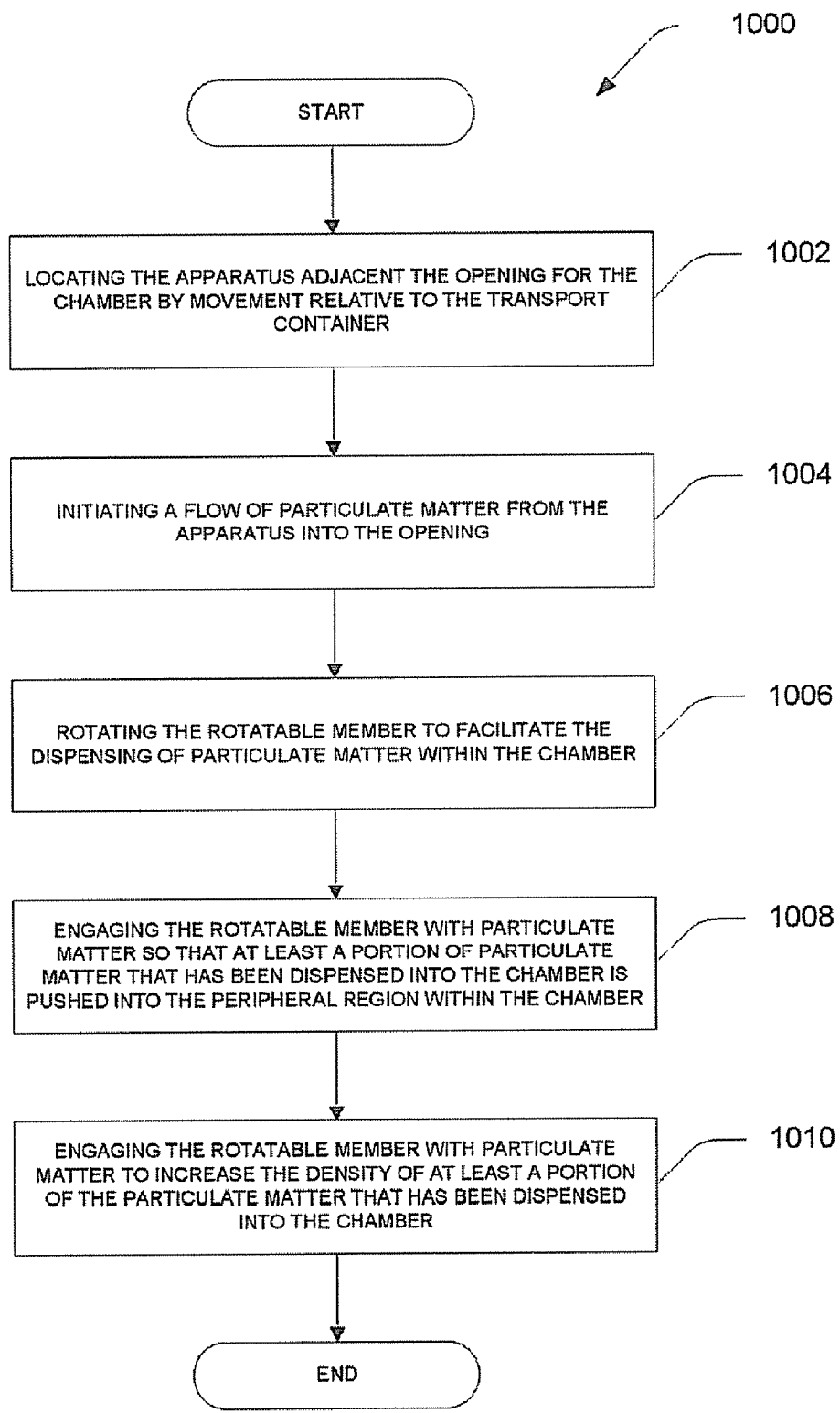
FIG. 30 is a process flow diagram illustrating a method of loading particulate matter into a transport container using an apparatus according to an embodiment.

An apparatus according to an embodiment includes a rotatable member configured to be positioned at least partially into an opening for the chamber. As shown in FIG. 30, a method 1000 of loading particulate matter into a transport container having at least one chamber with a peripheral region can include the act of 1002 locating the apparatus adjacent the opening for the chamber by movement relative to the transport container. The method can include the acts of 1004 initiating a flow of particulate matter from the apparatus into the opening, 1006 rotating the rotatable member to facilitate the dispensing of particulate matter within the chamber, and 1008 engaging the rotatable member with particulate matter so that at least a portion of particulate matter that has been dispensed into the chamber is pushed into the peripheral region within the chamber. According to an exemplary embodiment, the method 1000 can include the act of 1010 engaging the rotatable member with particulate matter to increase the density of at least a portion of the particulate matter that has been dispensed into the chamber.

According to an exemplary embodiment, the method can also include the acts of positioning the rotatable member at a height within the chamber to be in contact with at least a portion of the particulate matter that has been dispensed into the chamber and engaging the rotatable member with particulate matter to increase the density of at least a portion of the particulate matter that has been dispensed into the chamber.

Figure 31:
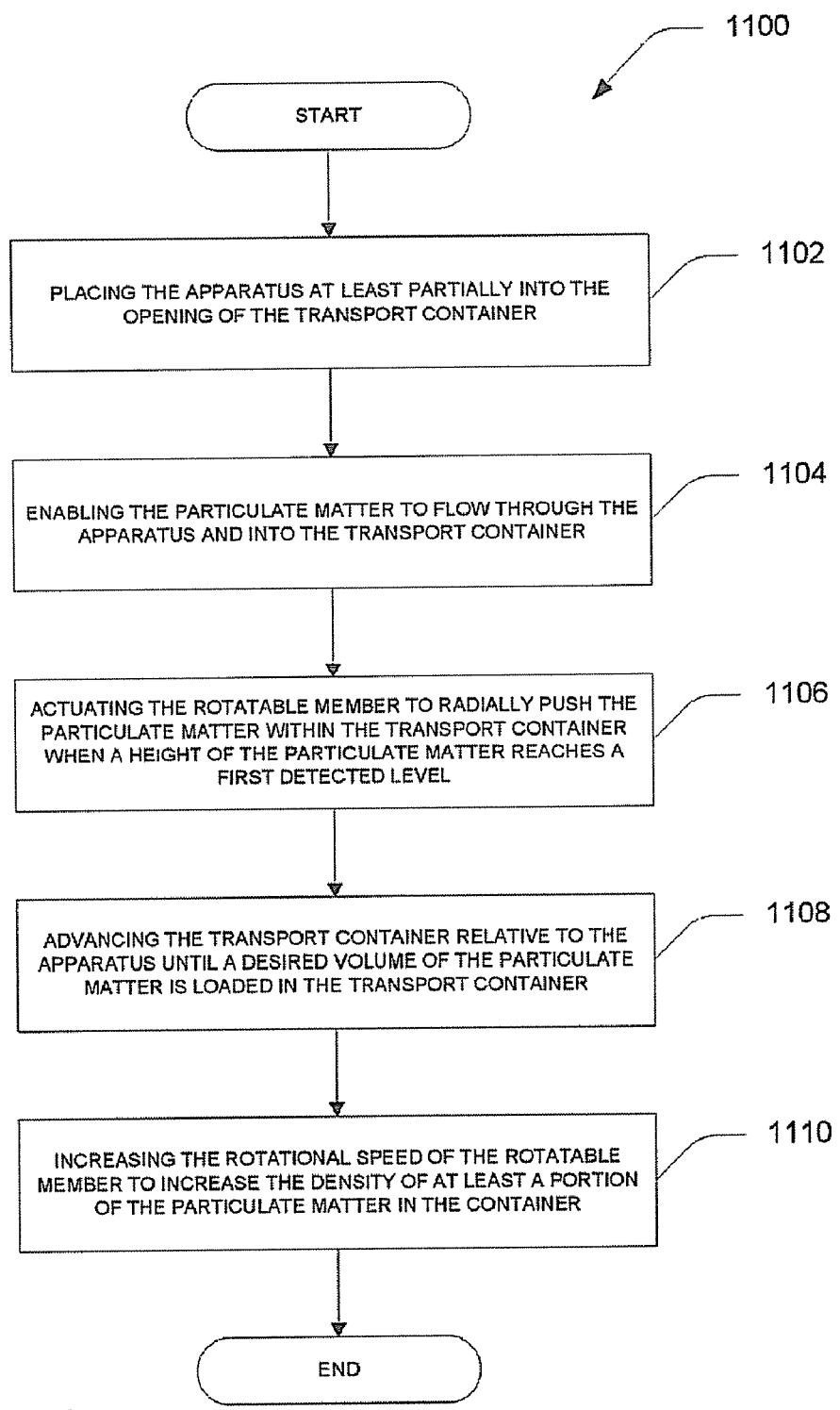
FIG. 31 is a process flow diagram illustrating a method of loading particulate matter into a transport container using an apparatus according to an embodiment.

According to an embodiment as shown in FIG. 31, a method 1100 of loading particulate matter into a transport container having at least one opening can be performed using an apparatus having a housing and a rotatable member extending at least partially below the housing. The method can include the acts of 1102 placing the apparatus at least partially into the opening of the transport container, 1104 enabling the particulate matter to flow through the apparatus and into the transport container, 1106 actuating the rotatable member to radially push the particulate matter within the transport container when a height of the particulate matter reaches a first detected level, and 1108 advancing the transport container relative to the apparatus until a desired volume of the particulate matter is loaded in the transport container. According to an exemplary embodiment, the method 1100 can also include the act of 1110 increasing the rotational speed of the rotatable member to increase the density of at least a portion of the particulate matter in the container.

As used in this application, the terms "dried distiller's grains," "DDG," "dried distiller's grains with solubles," "DDGS," "grains," "granular material," "pelletized material" or the like can refer to particulate matter. Although many types of biomass may be fermented in an alcohol plant producing various types of particulate products to be transported to other locations, a corn-based ethanol plant producing dried distillers' grains is discussed throughout this application for illustrative purposes of material properties and operational aspects for this invention. Also as used in the application, the terms "railcar," "container," or the like can refer to a transport container. It is understood that an embodiment is not limited to the loading of transport containers that are combined in a train, but can be used, for all loading processes of transport containers (e.g., for trucks, ships or the like).

The word "exemplary" is used to mean serving as an example, instance, or illustration. Any aspect or design described as "exemplary" is not necessarily to be construed as preferred or advantageous over other aspects or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

As used in this application, the term "or" is intended to mean an inclusive "or" rather than an exclusive "or." To the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

In view of the exemplary apparatus and methods, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described. Moreover, not all illustrated blocks may be required to implement the methodologies.

It is important to note that the construction and arrangement of the elements of the disclosed subject matter as described in this application and as shown in the figures is illustrative only. Although some embodiments have been described in detail in this disclosure, those skilled in the art who review this disclosure will readily appreciate that many modifications are possible (e.g. variations in size, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the disclosed subject matter. Other substitutions, modifications, changes and omissions may be made in the design, operating conditions and arrangement of the exemplary embodiments without departing from the spirit of the present inventions.

We claim:

1. A method of loading particulate matter into a transport container, comprising:
    placing an apparatus at least partially into a first opening of the transport container, wherein the apparatus comprises a housing and a rotatable member extending at least partially below the housing;
    enabling the particulate matter to flow through the apparatus and into a chamber of the transport container;
    actuating the rotatable member to radially push the particulate matter within the transport container when a height of the particulate matter reaches a first detected level;
    exerting an oscillating compressive force on particulate matter between the rotatable member and at least one wall of the transport container to increase the density of the particulate matter; and
    advancing the transport container relative to the apparatus until a desired volume of the particulate matter is loaded in the transport container.

2. The method of claim 1, further comprising immersing the rotatable member at least partially in the particulate matter before the actuating.

3. The method of claim 1, wherein the actuating comprises rotating the rotatable member.

4. The method of claim 1, further comprising increasing the rotational speed of the rotatable member to increase the density of at least a portion of the particulate matter in the transport container.

5. The method of claim 1, wherein the placing comprises locating the apparatus adjacent to the first opening.

6. The method of claim 1, wherein the enabling comprises initiating a flow of particulate matter from the apparatus into the chamber.

7. The method of claim 1, wherein the actuating comprises rotating the rotatable member to dispense particulate matter within the chamber.

8. The method of claim 1, wherein the actuating comprises engaging the rotatable member with particulate matter to push at least a portion of the particulate matter dispensed into the chamber into a peripheral region within the chamber.

9. The method of claim 1, further comprising continuing to actuate the rotatable member after the desired volume of particulate matter is loaded in the transport container to cause densification of the particulate matter.

10. The method of claim 1, wherein the advancing comprises indexing the transport container from a first location to a second location.

11. The method of claim 1, wherein the actuating causes particulate matter to build up behind the apparatus and propels the apparatus in a first direction.

12. The method of claim 1, wherein the actuating comprises rotating the rotatable member within the particulate matter to increase the density of at least a portion of the particulate matter that has been dispensed into the chamber.

13. The method of claim 1, wherein the placing comprises positioning the rotatable member at a depth within the chamber to be at least partially submerged in the particulate matter that has been dispensed into the chamber.

14. The method of claim 1, further comprising increasing the rotational speed of the rotatable member when the apparatus reaches an end of the transport container.

15. The method of claim 1, wherein the actuating pushes the particulate matter into a peripheral region within the chamber.

16. The method of claim 1, wherein the actuating further comprises varying the speed of the rotatable member as a function of the level of particulate matter in the transport container, the location of the apparatus along the transport container, characteristics of the particulate matter being loaded, or combinations thereof.

17. The method of claim 1, further comprising preventing operation of the apparatus if a lower edge of the housing is not engaged with or near the transport container.

18. The method of claim 1, further comprising:
sensing an internal wall between chambers of the transport container;
stopping the rotatable member when the internal wall is sensed; and
positioning the apparatus in an orientation to allow the apparatus to pass through an open section in the internal wall.

19. The method of claim 1, further comprising:
detecting the level of the particulate matter; and
adjusting the depth of the apparatus in the transport container to maintain a densifying effect on the particulate matter as the transport container is filled.

* * * * *